(12) United States Patent
Yamamoto et al.

(10) Patent No.: US 11,150,846 B2
(45) Date of Patent: Oct. 19, 2021

(54) STORAGE SYSTEM, COMPUTER-READABLE RECORDING MEDIUM, AND CONTROL METHOD FOR SYSTEM THAT RECONSTRUCTS AND DISTRIBUTES DATA

(71) Applicant: HITACHI, LTD., Tokyo (JP)

(72) Inventors: Takahiro Yamamoto, Tokyo (JP); Hiroaki Akutsu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 116 days.

(21) Appl. No.: 16/328,933

(22) PCT Filed: Mar. 28, 2017

(86) PCT No.: PCT/JP2017/012499
§ 371 (c)(1),
(2) Date: Feb. 27, 2019

(87) PCT Pub. No.: WO2018/179073
PCT Pub. Date: Oct. 4, 2018

(65) Prior Publication Data
US 2019/0243553 A1 Aug. 8, 2019

(51) Int. Cl.
*G06F 3/06* (2006.01)
*G06F 11/10* (2006.01)

(52) U.S. Cl.
CPC ............ *G06F 3/067* (2013.01); *G06F 3/0604* (2013.01); *G06F 3/0658* (2013.01); *G06F 3/0683* (2013.01); *G06F 11/10* (2013.01)

(58) Field of Classification Search
None
See application file for complete search history.

(56) References Cited

U.S. PATENT DOCUMENTS 5,524,204 A * 6/1996 Verdoorn, Jr. ...... G06F 11/1096
711/114
5,758,118 A * 5/1998 Choy .................. G06F 11/1092
711/114

(Continued)

FOREIGN PATENT DOCUMENTS

| JP | 200010738 A | 1/2000 |
| JP | 2016194928 A | 11/2016 |
| WO | 2016/052665 A1 | 4/2016 |

OTHER PUBLICATIONS

Japanese Office Action in corresponding Japanese Application No. 2019-508370 dated Jun. 2, 2020.

(Continued)

*Primary Examiner* — Gary W. Cygiel
(74) *Attorney, Agent, or Firm* — Mattingly & Malur, PC

(57) ABSTRACT

A data set is constructed from a first given number of data elements configured from a plurality of data and redundant data corresponding to the plurality of data. The first given number of data elements are deployed in a distributed relationship into a first given number of first nodes. When an instruction to increase the number of data elements of the data set from the first given number by a second given number, the data set is reconstructed using, as new data elements, the first given number of data elements and a second given number of zero data. A controller deploys the data elements of the reconstructed data set in a distributed relationship into the first nodes and the second given number of second nodes while zero data or redundant data are deployed into the second nodes from among the data elements of the reconstructed data set.

13 Claims, 15 Drawing Sheets

(56) References Cited

U.S. PATENT DOCUMENTS 7,996,608 B1 * 8/2011 Chatterjee ........... G06F 11/1096
711/114
2016/0371145 A1 12/2016 Akutsu et al.

OTHER PUBLICATIONS

International Search Report of PCT/JP2017/012499 dated Mar. 28, 2017.

* cited by examiner

FIG.4A

STRIPE MAPPING TABLE    301

|    | E0 | E1 | E2 | E3 |
|----|----|----|----|----|
| D1 | S1 | S0 | S1 | S0 |
| D2 | S2 | S3 | S3 | S2 |
| P1 | S3 | S2 | S0 | S1 |
| XY | S0 | S1 | S2 | S3 |

STRIPE GROUP NUMBER TABLE    409

| ELEMENT# | STRIPE GROUP# (D1) | STRIPE GROUP# (D2) | STRIPE GROUP# (P1) |
|----------|--------------------|--------------------|--------------------|
| 0x00     | 0x0001             | 0x0002             | 0x0003             |
| 0x01     | 0x0000             | 0x0003             | 0x0002             |
| 0x02     | 0x0001             | 0x0003             | 0x0000             |
| 0x03     | 0x0000             | 0x0002             | 0x0001             |

NODE NUMBER TABLE    410

| STRIPE GROUP# | DATA BLOCK ELEMENT# | CLASS1 CODE ELEMENT# | CLASS2 CODE ELEMENT# |
|---------------|---------------------|----------------------|----------------------|
| 0x0000        | 0x03, 0x01          | 0x02                 | 0x00                 |
| 0x0001        | 0x00, 0x02          | 0x03                 | 0x01                 |
| 0x0002        | 0x00, 0x02          | 0x01                 | 0x02                 |
| 0x0003        | 0x01, 0x02          | 0x00                 | 0x03                 |

FIG.5
CACHE MANAGEMENT TABLE 302
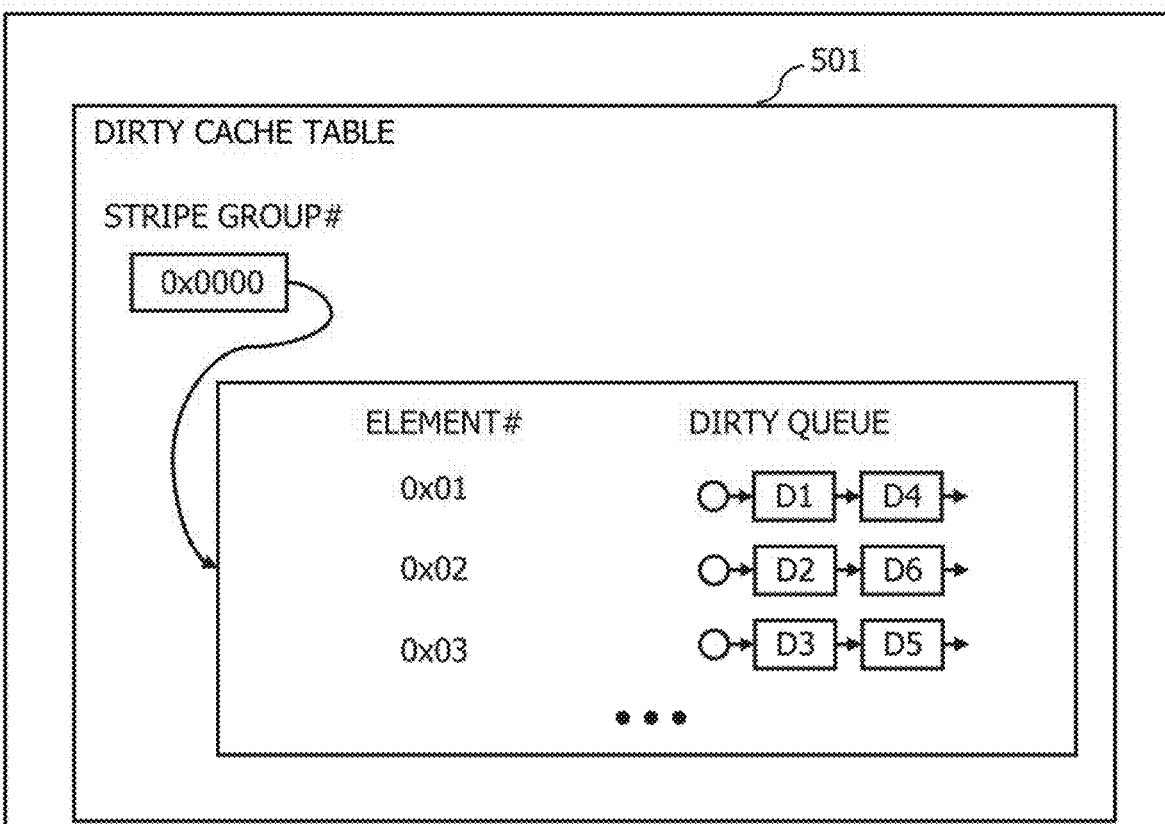
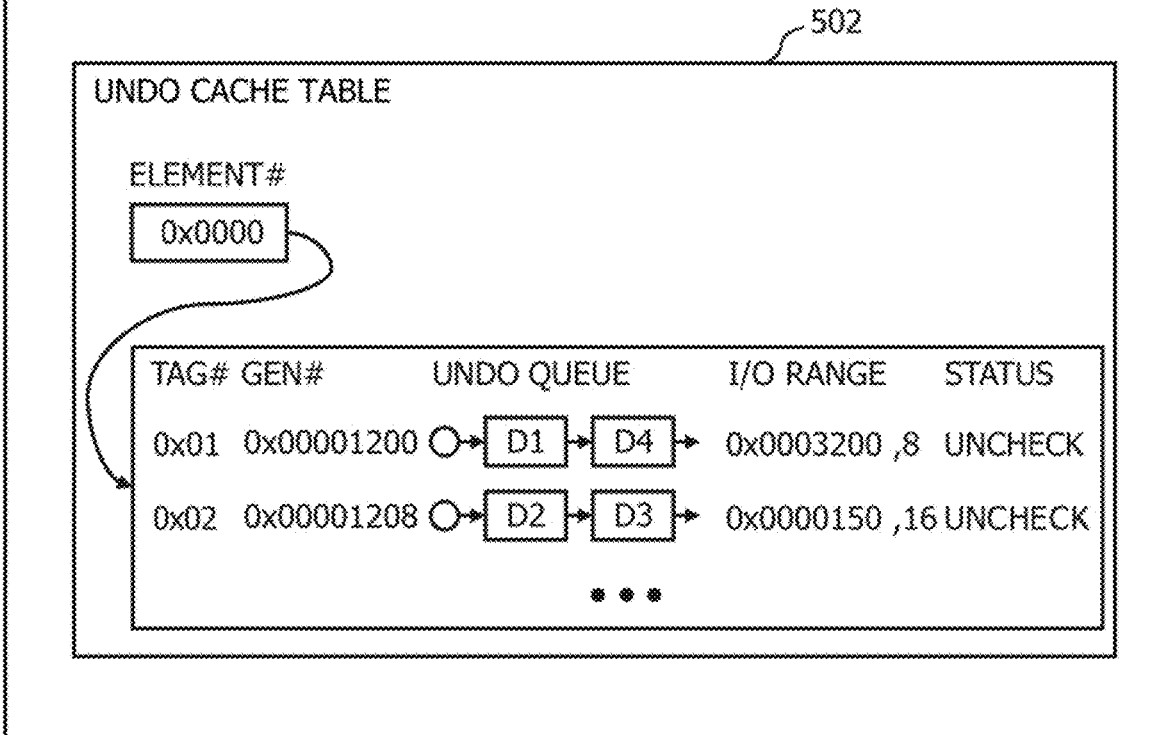

FIG.7

NODE STATE MANAGEMENT TABLE

304

| DATA NODE# | DATA DRIVE# | PROGRESS POINTER | NODE STATUS |
|---|---|---|---|
| 0x00 | 0x0000 | 0x00021000 | RECLUSTERING |
| 0x00 | 0x0000 | 0xFFFFFFFF | NORMAL |
| ... | ... | ... | ... |
| 0x01 | 0x0000 | 0x00045001 | RECLUSTERING |

CLUSTER RE-CONSTRUCTION PROCESS

HOST I/O PROCESS

ROLLBACK PROCESS

FIG.15
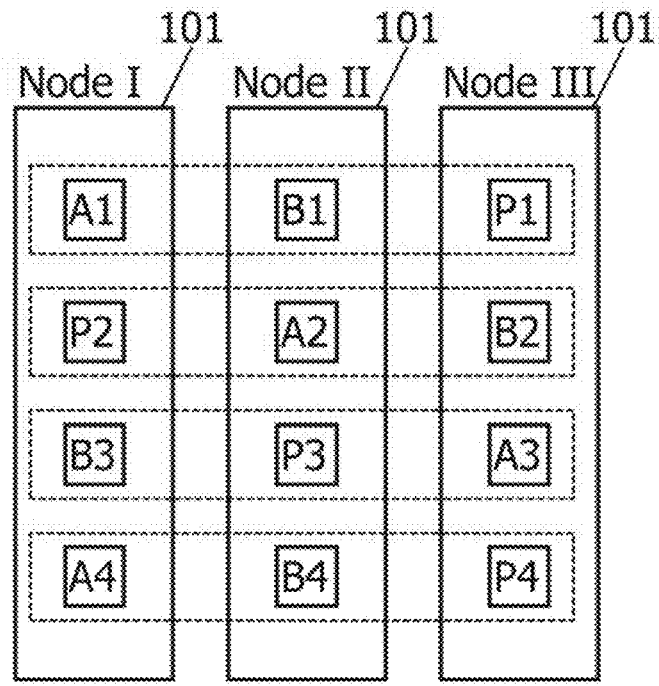
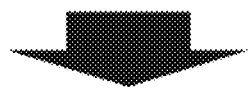
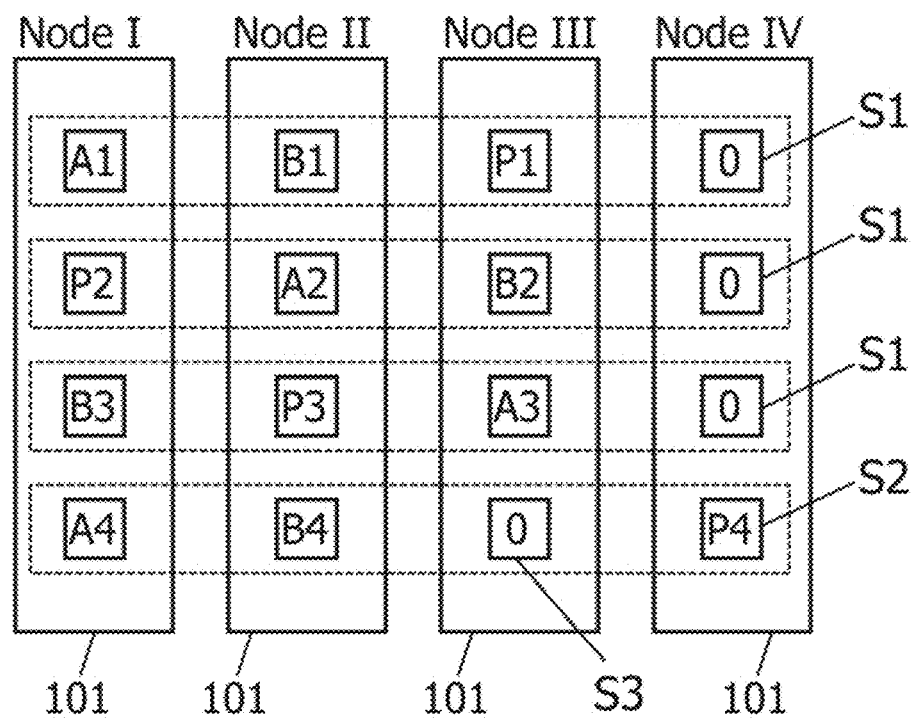

STORAGE SYSTEM, COMPUTER-READABLE RECORDING MEDIUM, AND CONTROL METHOD FOR SYSTEM THAT RECONSTRUCTS AND DISTRIBUTES DATA

TECHNICAL FIELD

The present invention relates to a storage system, a computer-readable recording medium, and a control method for a system.

BACKGROUND ART

As a document in which a background technology of the present technical field is disclosed, International Publication No. 2016/052665 (Patent Document 1) is available. In Patent Document 1, a technology is disclosed in which data is deployed in a distributed relationship in a plurality of nodes that configure a storage system.

PRIOR ART DOCUMENT

Patent Document

Patent Document 1: International Publication No. 2016/052665

SUMMARY OF THE INVENTION

Problem to be Solved by the Invention

In order to enhance the availability of a storage system, there is a case in which redundancy is provided to data among a plurality of nodes. In this case, even if a failure occurs in part of the nodes, the data of the node that suffers from the failure (failed node) can be restored (rebuilt) on the basis of data of the other nodes. For example, in the case where data elements of a data set that includes, as data elements, X data and Y redundant data corresponding to the X data are distributed to X+Y different nodes, if up to Y nodes fail, then the data elements of the failed nodes can be restored using the data elements of the remaining nodes that do not suffer from the failure (X and Y are integers of 1 or more). It is to be noted that the number of nodes of the storage system is not limited only to X+Y and it is sufficient if the number is X+Y or greater. Further, as a method for making data redundant, various methods are available such as a method for duplicating data (replication) between nodes or a method that uses parity or an erasure correction code (Erasure Code) as redundant data.

Incidentally, in recent years, a request to suppress the amount of money of capital investment to storage systems is increasing and reduction of the cost for storage of data has become increasingly important. As one of methods for reducing the cost for storage of data, it is conceivable to decrease the ratio of redundant data to data to increase the capacity efficiency of the storage of the storage system. In the example described above, although, in comparison with a data set in which X data and Y redundant data are data elements, the redundancy degree of a data set remains Y in a data set in which X+Z data and Y redundant data are data elements, the ratio of the redundant data to the data decreases, and the capacity efficiency of the storage enhances (Z is an integer of 1 or more).

As an example that is suitable to adopt a method in which the number of data elements of a data set increases in this manner, a case is available in which, in a data lake in an IoT (Internet of Thing) platform or the like, namely, in a data management system in which practical utilization of various big data is easy, the capacity efficiency of the storage is reviewed, for example, in accordance with increase of data. Further, as an example, a case is available in which a new node is added to a storage system. As a particular example, an example is available in which, when business is started, the storage system is operated with a small number of nodes in order to suppress the initial investment amount to the storage system, and then as the demand for a service to be provided by the business, a node or nodes are added to scale out the storage system. It is to be noted that the examples described above are examples to the end and do not limit the system in which the methods described above are adopted.

In Patent Document 1, it is disclosed that data are re-deployed when a node is added newly to a storage system. When data are re-deployed among a plurality of nodes in this manner, there is the possibility that, as the data amount of the storage system increases, the data transfer amount between the nodes may increase, and the load to a network for coupling the nodes and the load to the nodes may increase, which may have such an influence that a system performance such as an I/O (Input/Output) performance temporarily degrades or the like.

Therefore, a storage system is provided by which, when a data element in a data set in which data elements are deployed in a distributed relationship in a plurality of nodes is increased, the data transfer amount between the nodes can be reduced.

Means for Solving the Problem

In order to solve the subject described above, a storage system that is a mode of the present disclosure includes a plurality of nodes, and each of the plurality of nodes includes a controller. At least one or more of the plurality of nodes construct a data set from a first given number of data elements configured from a plurality of data and redundant data corresponding to the plurality of data. At least one or more of the controllers deploy the first given number of data elements of the data set in a distributed relationship into a first given number of first nodes from among the plurality of nodes. If at least one or more of the controllers receive an instruction for increasing the number of data elements constructing the data set from the first given number to a second given number, then the data set is reconstructed using, as new data elements, the first given number of data elements of the data set and the second given number of zero data. At least one or more of the controllers control such that the data elements of the reconstructed data set are deployed in a distributed relationship into the first given number of first nodes and the second given number of second nodes and zero data or redundant data are deployed into the second given number of second nodes from among the data elements of the reconstructed data set.

Effect of the Invention

With the present disclosure, when a data element is increased in the data set whose data elements are deployed in a distributed relationship in the plurality of nodes the storage system includes, the data transfer amount between the nodes can be reduced, and performance deterioration of the storage system can be suppressed. The above and other objects, features and advantages of the present invention will become apparent from the following description of modes for carrying out the invention.

BRIEF DESCRIPTION OF THE DRAWINGS

FIG. 4A is a view depicting a concept of a configuration of a stripe mapping table.

FIG. 4B is a view depicting a particular example of a configuration of the stripe mapping table.

FIG. 5 is a view depicting a configuration of a cache management table.

FIG. 7 is a view depicting a configuration of a node state management table.

FIG. 15 is a schematic view depicting an example of a process when the number of data elements of a data set is increased.

MODES FOR CARRYING OUT THE INVENTION

Figure 1:
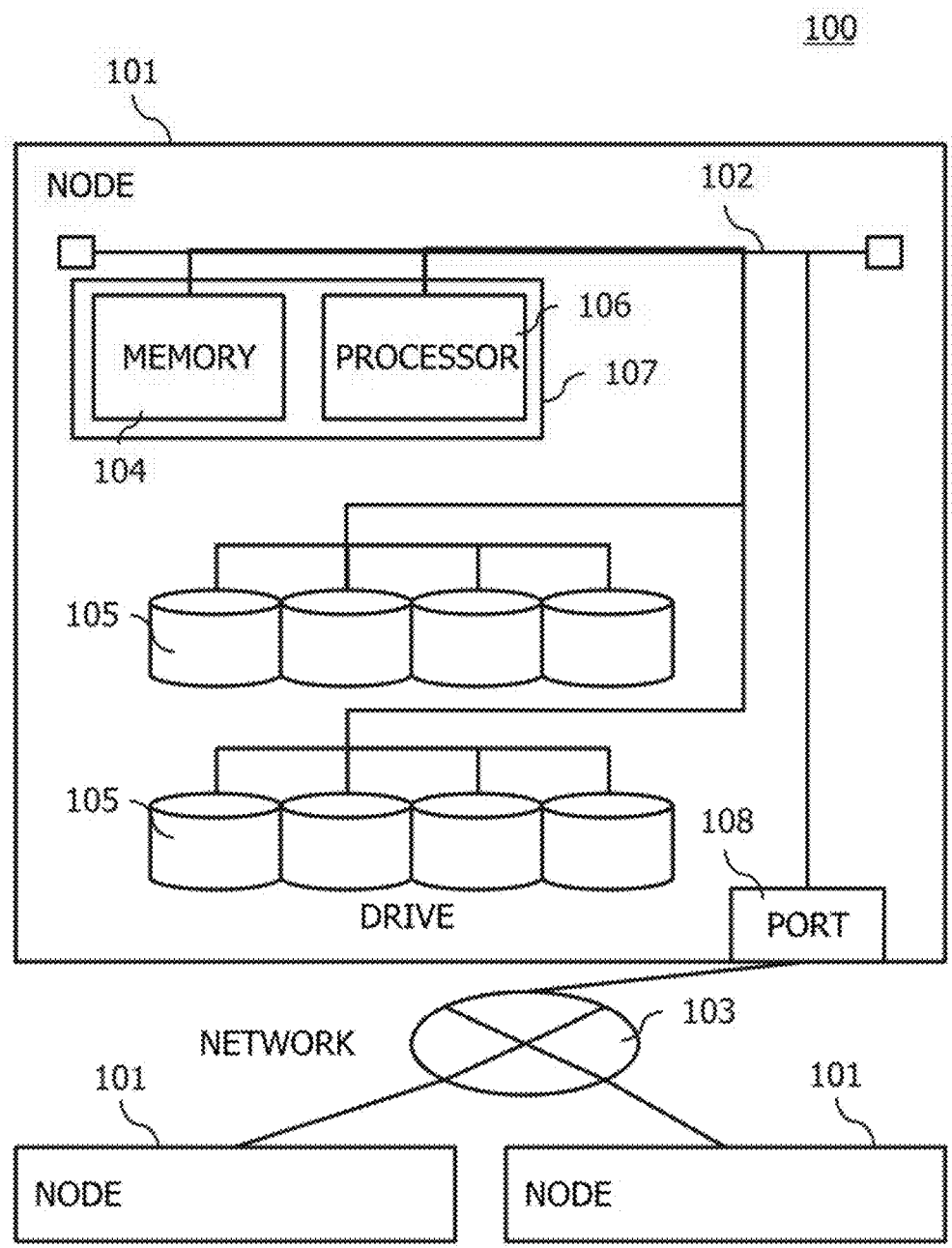
FIG. 1 is a view depicting a configuration of a distributed storage system in a working example 1.

In the following, an embodiment of the present invention is described with reference to the drawings. The following description and the drawings are exemplary for explaining the present invention and are subject to suitable omission and simplification for clarification of explanation. Further, all combinations of features described in the description of the embodiment are not necessarily essential to the solving means of the present invention. The present invention is not restricted by the embodiment, and all application examples that comply with the idea of the present invention are included in the technical scope of the present invention. Those skilled in the art can perform various additions, alterations and so forth for the present invention within the scope of the present invention. The present invention can be carried out also in various other forms. Unless otherwise specified, each component may be provided in a plural number or in a single number.

Although, in the following description, various kinds of information are described in such a representation as "table," "list" or "queue," the various kinds of information may be represented in a data structure other than them. In order to indicate that information does not rely upon a data structure, "XX table," "XX list" or the like is sometimes referred to as "XX information." Although such a representation as "identification information," "identifier," "name," "ID" or "number" when the substance of each piece of information is described, such representations can be replaced with each other.

Further, in the following description, in the case where description is given of elements of a same type without distinguishing them, a reference sign or a common number in reference signs is used, and in the case where elements of a same type are described distinctly from each other, the reference sign of each element is used or an ID allocated to the element is sometimes used in place of the reference sign.

Further, although, in the following description, a process performed by executing a program is sometimes described, since the program is executed by a processor (for example, a CPU) such that determined processes are performed while a storage resource (for example, a memory) and/or an interface device (for example, a communication port) and so forth are used suitably, the subject of the processes may be a processor. Similarly, the subject of processes performed by execution of a program may be a controller, an apparatus, a system, a computer, a node, a storage system, a storage apparatus, a server, a management computer, a client or a host in which a processor is provided. The subject (for example, a processor) of processes performed by execution of a program may include a hardware circuit that performs part or all of the processes.

A program may be installed from a program source into such an apparatus as a computer. The program source may be a recording medium that can be read, for example, a program distribution server or a computer. In the case where the program source is a program distribution server, the program distribution server may include a processor (for example, a CPU) and a storage resource, and the storage resource may further store a distribution program and a program that is a distribution target. Thus, the processor of the program distribution server may execute the distribution program and the processor of the program distribution server may distribute the program of the distribution target to a different computer. Further, in the following description, two or more programs may be implemented as one program, or otherwise one program may be implemented as two or more programs.

In the following description, at a step for decision in each flow chart, "Y" represents Yes and "N" represents No.

WORKING EXAMPLE 1

A distributed storage system 100 in the present embodiment includes a plurality of nodes 101 each including a storage device and is configured such that the nodes 101 are connected to each other by a network 103. The distributed storage system 100 implements a virtual storage system that implements a storage pool from the storage devices of the plurality of nodes 101.

Each storage device may be a single storage drive such as, for example, a HDD (Hard Disk Drive) or a SSD (Solid State Drive), a plurality of storage drives, a RAID (Redundant Arrays of Independent Disks) apparatus including a plurality of storage drives or a plurality of RAID apparatus. In the following description, the storage device is sometimes represented as drive 105.

A stripe is a data unit of a data block or a parity block (Class1 code) generated from the data block for the object of data protection. The stripe is stored into the storage device of a node 101 and is used for generation of a parity block (Class2 code) in a different node 101.

A stripe group is a combination of a stripe (data block or Class1 code) and a Class2 code generated from the stripe. The stripe group to which the stripes belong is determined, for example, by a logical address of the applicable stripe and the node 101 into which the applicable stripe is stored.

A stripe group is sometimes referred to as data set. The data set is configured from a given number of data elements. Here, the data elements are a data block, a Class1 code and a Class2 code included in the data set. The data set may be configured otherwise from a data block and a Class2 code and may or may not include a Class1 code.

Further, in the present working example, an example in which a Class2 code is generated from a data block by Erasure Coding (EC), and a stripe group is sometimes referred to as EC group. It is to be noted, however, even if the representation of EC group appears, the generation method of a Class2 code is not necessarily limited to EC.

In regard to stripes that configure a stripe group, the number of data blocks is sometimes referred to as D number, and the number of Class2 codes is sometimes referred to as P number. Further, in regard to the configuration of a stripe group, where the representation of mDnP is used using natural numbers m and n, this indicates that the stripe group is configured from m data blocks and n Class2 codes.

A host is a computer that accesses the distributed storage system 100, a processor that operates in the computer or a program executed by the applicable processor.

A data store node is a node 101 in which, when attention is paid to a particular stripe group, data blocks of the applicable stripe group are stored into the local drive 105. A parity store node is a node 101 into which, when attention is paid to a particular stripe group, Class2 codes of the applicable stripe group are stored into the local drive 105.

FIG. 1 is a view depicting a configuration of the distributed storage system 100 in the working example 1. The distributed storage system 100 includes a plurality of nodes 101, and a network 103 that connects the nodes 101. The distributed storage system 100 may be called computer system or information processing system. The network 103 may be called back end network.

It is sufficient if each node 101 is a computer and has a configuration, for example, of a general server computer. The node 101 may be called by any of representations including computer, computer node, server, storage apparatus and storage system.

The node 101 includes a back end port 108, a controller 107, a drive 105, and an internal network 102. The back end port 108, controller 107 and drive 105 are connected to each other through the internal network 102. Each of the components of the node 101 (back end port 108, controller 107, drive 105 and internal network 102) may include a single component or a plurality of components. It is to be noted that the hardware configuration of the node 101 is not limited to this example. For example, to the node 101, a hardware circuit for exclusive use for performing a specific process such as compression may be provided further.

The back end port 108 of each node 101 is connected to the network 103 and is connected to different nodes 101 through the network 103. The back end port 108 may be called port.

The controller 107 includes one or a plurality of memories 104 and one or a plurality of processors 106. The controller 107 may be, for example, a processor package. The processor 106 is a control section for executing a program and may be, for example, a CPU (Central Processing Unit). Each processor 106 executes a program in the memory 104 to execute various processes according to commands. The processor 106 may be sufficient if it is an arithmetic section or a control section that executes a program. In the following description, in regard to a process performed when the processor 106 executes a program on the memory 104, it is sometimes described that the node 101 or the controller 107 is a subject of processing.

The memory 104 is a storage section for storing a program to be executed by the processor 106. The memory 104 may be a volatile DRAM or may be formed using a nonvolatile SCM (Storage Class Memory) or the like.

The drive 105 may be sufficient if it is a storage device and may be called storage device. The drive 105 is, for example, a hard disk drive having an interface of FC (Fibre Channel), SAS (Serial Attached SCSI), SATA (Serial Advanced Technology Attachment) or the like, a SSD (Solid State Drive) having an interface of NVMe (Non-Volatile Memory Express) or the like in addition to the interface described above, or the like. Further, the drive 105 may be configured using an SCM such as a NAND, a PRAM or a ReRAM or using a volatile memory. In the case where a volatile memory is used, the storage device may be made a nonvolatile memory using a battery.

Each node 101 can use part of the memory 104 as a cache or a buffer. Further, the node 101 can use part of the drive 105 such as an SSD as a cache or a buffer.

A hypervisor may operate on the node 101 such that one or a plurality of virtual machines operate on the hypervisor. An OS or a program may operate on the virtual machines. In other words, the OS or the program sometimes operate on hardware of the node (physical computer) 101 and sometimes operate on the virtual machines.

Further, the host may be an application program (host program) 201 that operates on a virtual machine or may be a physical host computer (host computer). A virtual machine on which an OS or a storage controller program operates and a virtual machine on which a host program operates may be on the same node 101 or may be on different nodes 101 that are connected to each other through the network 103. Here, the storage controller program is a program for controlling the distributed storage system 100 and is a program that includes, for example, part or all of various programs 305 to 307 depicted in FIG. 3. Further, the storage controller program may be part of a hypervisor.

Further, when the distributed storage system 100 includes a plurality of nodes 101, part of the nodes 101 may be on a different site. Further, part or all of the nodes 101 of the distributed storage system 100 may be on a cloud such that a service is provided to users through a network.

Also to such a configuration example as described above, the present disclosure can be applied. Although generally a virtual machine has a form in which it operates on a virtual hardware resource provided by a hypervisor and access to the hardware resource is performed through the hypervisor, depending upon a function provided in the hypervisor, a virtual machine is sometimes enabled to directly access a hardware resource. This is a so-called pass-through technology.

In the following, unless otherwise specified, a process described taking the distributed storage system 100 as the subject may be performed by one of the nodes 101 of the distributed storage system 100 or may be performed in cooperation or independently of a plurality of nodes 101.

FIG. 15 is a schematic view depicting an example of processing when the plurality of nodes 101 the distributed storage system 100 has increase data elements in data sets in which data elements are deployed in a distributed manner.

In the following, description is given representing the distributed storage system 100 having a configuration before a node 101 is added as distributed storage system 100-1 and representing the distributed storage system 100 having a configuration after a node 101 is added as distributed storage system 100-2.

The distributed storage system 100-1 has redundancy of data between the plurality of nodes 101 in order to increase the system availability. According to the example of FIG. 15, data elements of a data set that has X data (for example, Ai, Bi) and Y redundant data (for example, Pi) corresponding to the applicable X data as data elements are distributed to X+Y different nodes 101. Here, each of X and Y is an integer equal to or greater than 1. Further, i is an integer equal to or greater than 1, and in FIG. 15, the data elements of the data set i are represented by Ai, Bi and Pi.

If a number of nodes 101 up to Y fail, then the distributed storage system 100-1 can recover data elements of the nodes that suffer from the failure (failed nodes) using data elements of the remaining nodes 101 that are free from the failure. Here, to recover data elements of the failed nodes includes that the data elements stored in the failed nodes are rebuilt without stopping a business that is operating in the distributed storage system 100-1. The data set after rebuilt can recover the redundancy up to a redundancy degree Y.

It is to be noted that, if data of the distributed storage system 100-1 are backed up, then even if a number of nodes 101 exceeding Y suffer from a failure, the data can be restored using the backed up data.

The schematic view of the distributed storage system 100-2 in FIG. 15 depicts an example of data deployment when Z data are added as data elements to each data set. Here, Z is an integer equal to or greater than 1. In comparison with a data set whose data elements are X data and Y redundant data, in a data set whose data elements are X+Z data and Y redundant data, although the redundancy degree of the data set remains Y, the ratio of the redundant data to the data decreases and the capacity efficiency of the storage enhances. In this manner, by increasing data elements of a data set and decreasing the ratio of redundant data to data, the capacity efficiency of the storage of the distributed storage system 100 can be increased. As a result, the cost for storing data can be reduced, and the investment amount of money to the distributed storage system 100 can be suppressed.

The distributed storage system 100-2 is configured such that Z or more new nodes 101 are added to the distributed storage system 100-1. In the example of FIG. 15, the distributed storage system 100-1 is configured from Node I, Node II and Node III, and the distributed storage system 100-2 is configured such that Node IV is added to the distributed storage system 100-1. This newly additional node is referred to as additional node.

As depicted by S1 of FIG. 15, the distributed storage system 100-2 configures the Z data added to each data set as zero data and controls the zero data so as to be deployed in the additional node. If the data elements newly added to the data set are zero data, then the values of the Y redundant data corresponding to the X data of the data set before the data elements are added and the values of the Y redundant data corresponding to the X+Z data of the data set after the data elements are added coincide with each other. Accordingly, there is no necessity to recalculate the redundant data, and the calculation load therefore can be omitted. Besides, also it is unnecessary to collect data from the nodes 101 in order to calculate redundant data, and the data transfer amount between the nodes 101 can be reduced.

Further, since the data deployment of X data and Y redundant data of a data set before data elements are increased does not change after data elements are increased, data movement between the nodes 101 becomes unnecessary and the data transfer amount between the nodes 101 can be reduced. Here, that the data deployment does not change is intended not to change the node 101 into which the data are to be stored, also the storage device into which data is to be stored in each node 101 may not be changed.

Here, as the distribution method of data, a method of deploying redundant data into only particular ones of the plurality of nodes 101 and another method of distributing redundant data into each node 101 are available. According to the former method of deploying redundant data only into particular nodes, it is possible to set all data elements to be placed into an additional node to zero data. However, according to this method, writing or reading out of redundant data is concentrated on the particular nodes, resulting in the possibility that the particular nodes may become a bottle neck to the performance for writing and reading out. Further, it is not easy to uniformize the storage capacity to be consumed by the nodes 101. Furthermore, if it is assumed that a business application (application program) is not permitted to operate in the particular nodes in which redundant data is placed, then there is the possibility that efficient use of a computer resource such as a processor cannot be achieved. From these reasons, the method of distributing redundant data to each node 101 is one of embodiments desirable as the distributed storage system 100. In the following, a case in which the method of distributing redundant data to each node 101 is described.

S2 of FIG. 15 indicates an example in which redundant data are deployed into an additional node. Of which data set redundant data are to be placed into the additional node is determined in accordance with a data distribution method adopted by the distributed storage system 100. In the example of FIG. 15, data deployment of four data sets is depicted, and redundant data of one of the data sets are deployed in the additional node. As regards the remaining three data sets, zero data are placed in the additional node.

As described above, if the data elements added newly to a data set are zero data, then the values of the redundant data before data elements are increased and the values of the redundant data after data elements are increased coincide with each other. Accordingly, it is sufficient if the redundant data to be deployed into the additional node are moved or copied from the node (Node III) in which redundant data before data elements are increased are deployed to the additional node.

Alternatively, the redundant data may be recalculated from the other data elements of the same data set and deployed into the additional node.

S3 of FIG. 15 indicates that, when redundant data are placed into the additional node, zero data is placed into the node (Node III) in which the redundant data before data elements are added are deployed.

The method of enhancing the capacity efficiency of the storage by increasing, when a new node 101 is to be added to the distributed storage system 100, the data element number of a data set is described above. As an example suitable to adopt such a method as just described, an example is available in which, when starting a business, a small number of node 101 are operated in order to suppress the initial investment amount to the distributed storage system 100, and as the demand for a service provided by the business increases, a node 101 or nodes 101 are added newly to scale out a distributed storage system 100. It is to be noted that this example is an example to the last and does not at all restrict the distributed storage system 100 that adopts the method described above.

As the method for making data redundant, various methods are available such as a method for duplicating (replicating) data between nodes and a method that uses a parity or erasure correction code (Erasure Code) as redundant data.

It is sufficient if the number of nodes 101 (hereinafter referred to also as node number) of the distributed storage system 100 is equal to greater than the number of data elements of each data set to be distributed. In particular, the node number of the distributed storage system 100-1 is not limited to X+Y, but it is sufficient if it is equal to or greater than X+Y. Similarly, the node number of the distributed storage system 100-2 is not limited to X+Y+Z, but it is sufficient if it is equal to or greater than X+Y+Z.

Also in the case where the node number of the distributed storage system 100 is greater than the number of data elements of each data set, the data elements of each data set are distributed to and stored into different nodes 101 of the distributed storage system 100. The combination of nodes for distribution may differ between different data sets.

Although it is described above that the Z data to be added to each data set are zero data, particular examples of the method of storing zero data are described. The first particular example is a method of actually deploying zero data in the node 101 into which the zero data are to be placed. The second particular example is a method of managing, in the node 101 into which the zero data are deployed, the data as zero data. In this case, zero data may be stored or not stored in the drive 105 of the node 101. By making it unnecessary to store zero data, the load for storing zero data can be suppressed. Further, in the case where zero data are not stored, to a logical address that becomes a distribution destination of the applicable zero data, an actual storage region configured from one or more drives 105 the applicable node 101 has may be allocated or not allocated. In the case of zero data, by not allocating an actual storage region, an unused actual storage region of the applicable node 101 can be increased, and the capacity efficiency of the storage can be enhanced. Accordingly, as a method of managing, in a node 101 into which zero data are to be placed, the applicable data as zero data, a method of managing information, which indicates that the applicable data is zero data, in an associated relationship with an address that becomes a deployment destination of the applicable zero data, a method of not allocating an actual storage region to a logical address that becomes a deployment distribution of the applicable zero data and so forth are available. In the case where there is a reading out request for an address that becomes a deployment distribution of zero data, if zero data can be responded, then any method may be adopted.

In the distributed storage system 100, addition of a new node 101 may be executed when an instruction to add a node 101 is received from a management apparatus or when addition of a node 101 is detected automatically. Here, the management apparatus is an apparatus for managing the distributed storage system 100. Increase of data elements of a data set may be executed in accordance with an instruction from the management apparatus. Addition of a new node 101 and increase of data elements of a data set may be performed at the same time or may be performed at different timings.

Further, the addition of a new node 101 is not necessarily a configuration required for carrying out the present invention. In particular, in the case where the distributed storage system 100-1 has a number of nodes equal to or greater than the data element number X+Y+Z after the number of data elements of a data set is increased, even if a node 101 is not added, the data elements of the data set can be increased.

As an example suitable to adopt the method of increasing data element number of a data set in this manner, a case is available in which, in a data lake in an IoT (Internet of Things) platform or the like, namely, in a data management system in which utilization of various big data is easy, the capacity efficiency of the storage is reviewed, for example, in accordance with increase of data. It is to be noted that this is only one example and does not at all restrict the distributed storage system 100 that adopts the method described above.

Figure 2:
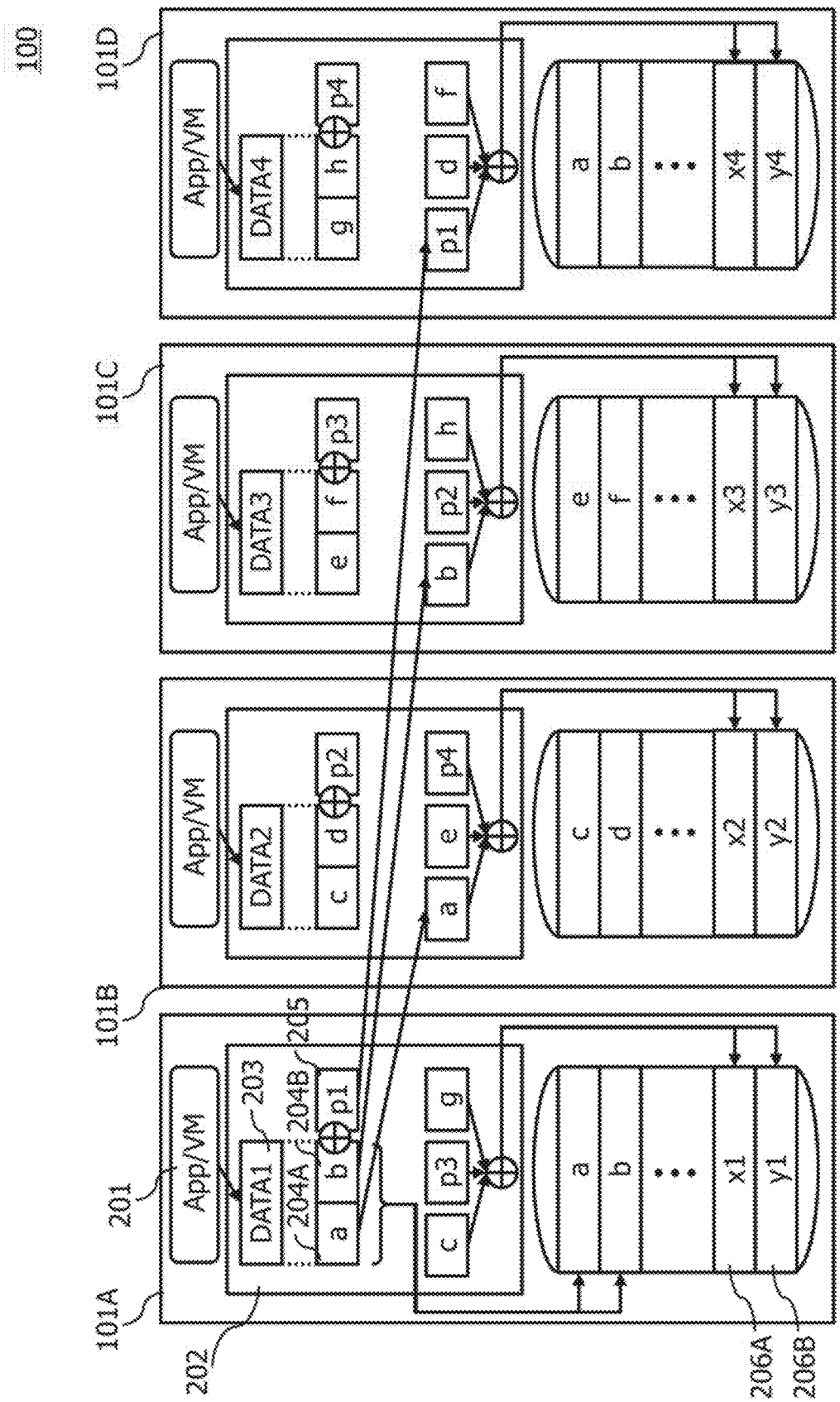
FIG. 2 is a view depicting an overview of a write process of the distributed storage system.

FIG. 2 is a view depicting an overview of a write process of the distributed storage system 100. The distributed storage system 100 transfers a data block between nodes 101 in order to make the data block redundant.

In the following, a method by which a node 101 generates a primary redundant code on the basis of a data block and transfers the primary redundant code to the other nodes 101 together with the applicable data block such that the nodes 101 of the transfer destination generate a secondary redundant code.

FIG. 2 depicts an example in which four nodes, namely, nodes 101A, 101B, 101C and 101D the distributed storage system 100 protect data by redundant configuration of 2D2P. In short, the distributed storage system 100 has redundancy by which, when two nodes fail, all data can be recovered.

For example, the node 101A decomposes a write data block 203 of a long data length received from an application program or virtual machine 201 into two data blocks (a block 204A and b block 204B) and further generates one p1 block 205 that is a primary redundant code from the divisional data blocks. This primary redundant code is a redundant code of, for example, a parity block or the like and is sometimes called Class1 code.

Then, the node 101A distributes and copies the data blocks 204A and 204B and Class1 code 205 into caches (or buffers) of the other nodes 101B to 101D. In the example of FIG. 2, the node 101A copies the data block 204A, data block 204B and Class1 code 205 into the node 101B, node 101C and node 101D, respectively. Each node 101 that becomes the copy destination is determined from a node number at which the write data is received and a write destination address using a stripe mapping table 301 hereinafter described. In the following, the node 101 that is a copy destination is sometimes referred to as destination node.

At a point of time at which the copy is completed, since necessary redundancy is obtained (recovery of the two nodes from the failure is possible), the synchronous write process is completed.

Similarly, each of the nodes 101B to 101D decomposes the individually received write data block (DATA2 to DATA4) into two data blocks and further generates Class1 code. Each of the nodes 101B to 101D distributes and copies the divisional data blocks and Class1 Code into the caches (or buffers) of the other three nodes 101. Each node 101 stores copies of the data blocks and Class1 code received from the other three nodes 101 into the cache (or buffer).

The node 101A generates an x1 block 206A and a y1 block 206B, which are secondary redundant codes, from the data blocks or Class1 codes aggregated from the other three nodes 101 from the write process asynchronously. This secondary redundant code is a redundant code such as, for example, a parity block and is sometimes referred to as Class2 code.

Similarly, each of the nodes 101B to 101D individually generates Class2 code from the data blocks or Class1 codes aggregated from the other three nodes asynchronously.

Each of the nodes 101A to 101D writes the individually generated Class2 code into the local drive 105. Further, each of the nodes 101A to 101D releases the region of the cache (or buffer) in which a copy of the data blocks or Class1 codes used for generation of the applicable Class2 code is stored.

Although FIG. 2 depicts an example of the 2D2P redundant configuration, the method of the present working example can be applied to an arbitrary mDnP (m and n are natural numbers). A write data block (mD) is stored into the local drive 105 and transferred to the other nodes 101 together with a number of Class1 codes having a redundancy degree decreased by 1 (redundancy degree is n−1). For example, in the 3D2P configuration (d1, d2, d3 and p), write data blocks (d1+d2+d3) are stored into the local drive 105, and the data blocks d1, d2, d3 and p are transferred to the nodes 101 different from each other.

Figure 3:
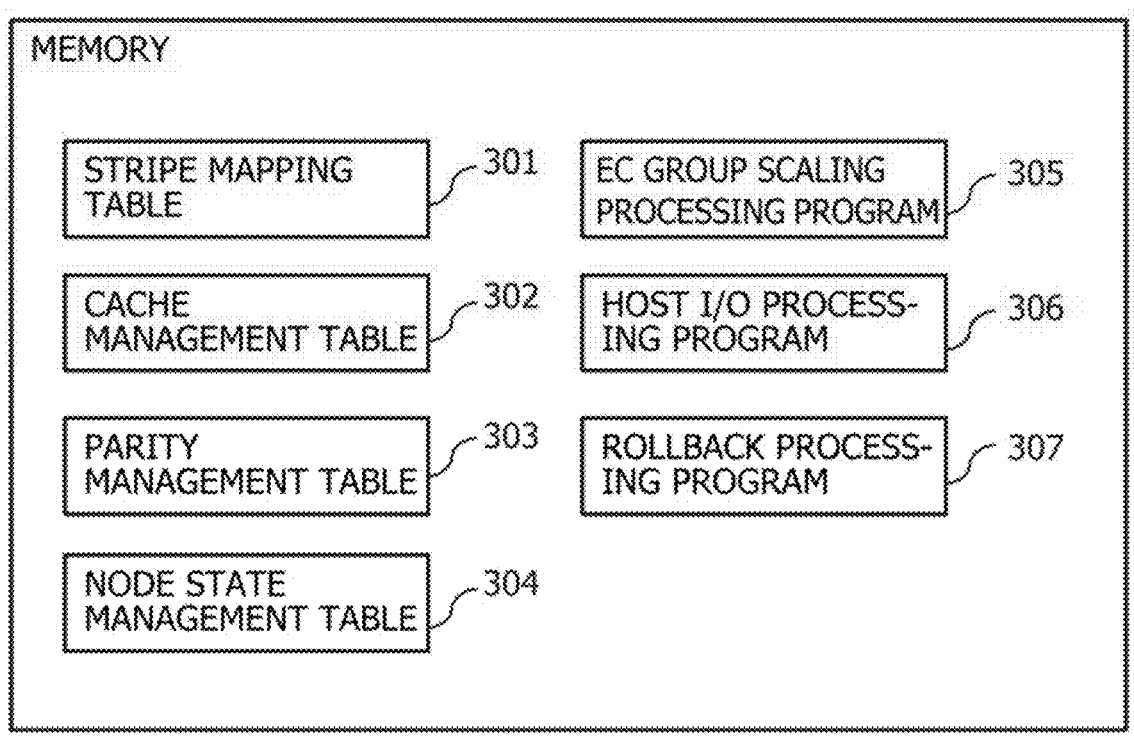
FIG. 3 is a view depicting a configuration of a memory.

FIG. 3 is a view depicting a configuration of the memory 104. Into the memory 104 of each node 101 of the distributed storage system 100, information or a program for controlling the distributed storage system 100 is stored. For example, into the memory 104, a stripe mapping table 301, a cache management table 302, a parity management table 303, a node state management table 304, an EC group scaling processing program 305, a host I/O processing program 306 and a rollback processing program 307 are stored. The various programs 305 to 307 are executed by the processor 106. In the following description, management information including the stripe mapping table 301, cache management table 302, parity management table 303 and node state management table 304 is sometimes referred to as various management information 301 to 304.

The stripe mapping table 301 includes information of combinations of stripe group numbers and is used when a destination node that becomes a copy destination of a data block or a Class1 code is determined or when a data block stored in a node 101 with which failure occurs is rebuilt.

The cache management table 302 includes information relating to cache of dirty data for generating a Class2 code or undo data for maintaining the consistency of Class2 code. The parity management table 303 includes management information of a Class2 code stored in a log structured form and storage position information of a data block configuring a Class2 code. The node state management table 304 includes information of an operating state of each node 101.

The EC group scaling processing program 305 is a program for controlling an EC group scaling request from a user or a cluster management program. The host I/O processing program 306 is a program for controlling an I/O request from a host such as an application program or a virtual machine. The rollback processing program 307 is a program for controlling the consistency of a Class2 code between parity store nodes when a failure occurs with a data store node.

The memory 104 stores, a storage program for implementing a storage function, an OS and an interface program in addition to the information and programs depicted in FIG. 3. Further, the memory 104 sometimes stores an application program for executing a business.

A copy of all or part of the various programs including the various management information 301 to 304 and the programs 305 to 307 described above is stored synchronously or asynchronously into the drive 105 for the object of backup or the like.

In the following, an example of a configuration of information retained in the memory 104 (stripe mapping table 301, cache management table 302, parity management table 303 and node state management table 304) is described with reference to FIGS. 4A, 4B, 5, 6 and 7. In each table, only part of entries are depicted. In each table, a blank cell is a cell in which description of data is omitted. In a cell of the tables, "0x" represents a hexadecimal number.

FIG. 4A is a view depicting a concept of a configuration of the stripe mapping table 301. The stripe mapping table 301 of FIG. 4A indicates that the distributed storage system 100 forms a cluster from four nodes (E0 to E3). The configuration of the EC group is 2D2P, and the cycle number C is 2.

The stripe mapping table 301 depicted in FIG. 4A includes a column number 401 as a column element (E0 to E3) and includes a row number 402 as a row element (D1, D2, P1, XY).

The column number 401 is sometimes referred to as element number. The element number may be any of information that designates, for example, a node number, a drive number or both of a node number and a drive number.

The row number 402 includes information (D1, D2) for specifying a data block, information (P1) for specifying a Class1 code, and information (XY) for specifying a Class2 code. The row number 402 may be, for example, a logical address indicative of a storage destination of a data block Class1 code or a Class2 code.

Further, the stripe mapping table 301 includes a stripe group number (S0 to S3) in each cell 403 designated by a column number 401 and a row number 402. The stripe group number is information for identifying a stripe group. The stripe group is a combination of a stripe (data block or Class1 code) and a Class2 code generated from the applicable stripe.

In the stripe mapping table 301, a stripe and a Class2 code corresponding to a same stripe group number belong to a same stripe group of the applicable stripe group number. A stripe group to which each stripe belongs is determined, for example, from a logical address (corresponding to a row number 402) of the applicable stripe and a node number (corresponding to a column number 401) of the node 101 in which the applicable stripe is stored. Thus, the controller 107 generates a Class2 code from a plurality of stripes belonging to the same stripe group. Further, the controller 107 stores a Class2 code into the node 101 of a node number (column number 401) corresponding to the applicable stripe group number and the row number (XY) of the Class2 code in the stripe mapping table 301.

The stripe mapping table 301 includes three sectors of a data part 404, a Class1 code part 405 and a Class2 code part 406. In the example of FIG. 4A, the data part 404 is sectors whose row number 402 is D1 and D2; the Class1 code part 405 is a sector whose row number 402 is P1; and the Class2 code part 406 is a sector whose row number 402 is D1 and D2.

The data part 404 manages stripe group numbers corresponding to data blocks written in by an application program or a virtual machine.

The Class1 code part 405 manages stripe group numbers corresponding to Class1 codes generated by decomposition of written in data blocks. A Class1 code is generated from a data block corresponding to the data part 404 of the same column number 401. For example, in the case where the column number 401 is E0, a Class1 code (P1) is generated from the data blocks written in the logical addresses of D1 and D2 corresponding to E0.

The Class2 code part 406 manages stripe group numbers of Class2 codes stored in the nodes 101 of the element numbers (column number 401). For example, in the case of the column of E0, a Class2 code has a stripe group number of S0 and is generated from the data part 404 and the Class1 code part 405 that correspond to the same stripe group number. In particular, a Class2 code of the column of E0 is generated from the D1 data block of the column of E1, a Class1 code of the column of E2 and the D1 data block of the column of E3. Therefore, the destination node that is a copy destination of the D1 data block of the column of E1, the Class1 code of the column of E2 and the D1 data block of the column of E3 becomes the node 101 of the node number of E0.

Further, for example, by calculating in the following manner, a destination node that becomes a copy destination (transfer destination) of the data block and Class1 code thus written in is determined. In the following description, C indicates a cycle number (row number) of the data part, and the stripe size indicates a data size per one cell. LBA is a logical block address (Logical Block Address) indicative of a logical data place of a block. In the following data, a cell position in the stripe mapping table 301 is indicted by (column number 401, row number 402).

(1) Data Block

The controller 107 stores data blocks into the drive 105 of a local node 101 so as to be straightly mapped in the LBA order. In order to determine a destination node of a data block, the controller 107 calculates a column number 401 and a row number 402 using the column number 401 as a node number and the row number 402 as (LBA/stripe size) mod C. The controller 107 acquires a stripe group number stored in a cell positioned at the cell position of (node number, (LBA/stripe size) mod C) in the data part 404 of the stripe mapping table 301. The controller 107 acquires a column number 401 of a cell into which a stripe group number same as the acquired number is to be stored in the Class1 code part 406 of the stripe mapping table 301 and transfers the data block to the node 101 corresponding to the applicable column number 401.

(2) Class1 Code

The controller 107 calculates a column number 401 and a row number 402 using the column number 401 as a node number and the row number 402 as P1 in regard to a Class1 code. The controller 107 acquires a stripe group number stored in a cell positioned at the cell position of (node number, P1) in the Class1 code part 405 of the stripe mapping table 301. The controller 107 acquires a column number 401 of a cell into which a stripe group number same as the acquired number is to be stored in the Class2 code part 406 of the stripe mapping table 301 and transfers the Class1 code to the node 101 corresponding to the applicable column number 401.

Further, the destination node that receives the data block and the Class1 code generates a Class2 code from the data block and the Class1 code and stores the Class2 code into the drive 105 such that it is straightly mapped from a terminal end of the data part 404 mapped to the drive 105. At this time, x, y parity blocks that are a plurality of Class2 codes generated from the same stripe are stored into successive regions in the drive. Consequently, the Class2 codes can be read out sequentially, and there is an advantage that the penalty upon rebuilding can be reduced.

The stripe mapping table 301 is not limited to the example of FIG. 4A and, for example, in the same column, stripe group numbers may be exchanged arbitrarily.

FIG. 4B is a view depicting a particular example of a configuration of the stripe mapping table 301. In other words, the stripe mapping table 301 of FIG. 4A may have the configuration depicted in FIG. 4B.

The stripe mapping table 301 of FIG. 4B includes a stripe group number table 409 for converting a node number into a stripe group number, and a node number table 410 for converting a stripe group number into a node number.

The stripe group number table 409 includes an element number, a stripe group number (D1), another stripe group number (D2) and a further stripe group number (P1). The element number is a node number into which a data block is to be stored and corresponds to the column number 401. The stripe group number (D1) and the stripe group number (D2) are stripe group numbers corresponding to rows of the data part 404. The stripe group number (P1) is a stripe group number corresponding to the Class1 code part 405.

The node number table 410 includes a stripe group number, a data block element number, a Class1 code element number, and a Class2 code element number.

The data block element number is a node number of a node having a data part 404 corresponding to a stripe group number of the same row. The Class1 code element number is a node number of a node having a Class1 code part 405 corresponding to the stripe group number of the same row. The Class2 code element number is a node number of a node (destination node) having a Class2 code part 406 corresponding to the stripe group number of the same row.

FIG. 5 is a view depicting a configuration of the cache management table 302. The cache management table 302 is configured to include a dirty cache table 501 and a undo cache table 502.

The dirty cache table 501 manages data blocks for calculating a Class2 code. The dirty cache table 501 includes a stripe group number, an element number and a dirty queue. The stripe group number is a number for generating a Class2 code with a data block of a same stripe group number. The element number and the dirty queue are managed for each stripe group number. The element number is a number of a column element managed by the stripe mapping table 301 and is a transmission source of a data block. The dirty queue is a data block transferred to the other nodes in order to generate a Class2 code. The dirty queue retains not only data block main bodies but also position information (node number, drive number) in which the data blocks are stored.

The undo cache table 502 manages an undo queue for maintaining consistency of a Class2 code between parity store nodes when a failure occurs with a data store node. The undo cache table 502 includes an element number, a tag number, an undo queue, an I/O range and a state. The tag number is a number attached to a host I/O, and a number of numbers equal to the multiplicity of the host I/O capable of being processed by the applicable system exist. The undo queue is data blocks or an intermediate code to be used upon rollback processing of a Class2 code. In the undo queue, not only undo data main bodies themselves but also position information (node number, drive number) in which the undo data are stored are retained. The undo data are queued into an entry corresponding to an element number and a tag number by which write data are received. Further, when write data having same element numbers and same tag numbers but having different generation numbers are received, they are discarded once, and received write data are newly queued. The I/O range indicates which data block is updated simultaneously with the received I/O. With this, upon failure of a data store node, a node (element) with which the consistency is to be taken by the entry is decided. In particular, as the I/O range information, a start address and a data transfer length are recorded. The state is a state of each row, and it is confirmed whether the state of each row is a state in which the consistency with a Class2 code is confirmed. When a failure occurs with a data store node, an inquiry about whether or not the state is consistent with an unchecked entry is issued to a different parity store node to confirm the same. After the consistency is confirmed, the state of the entry is changed to checked.

Figure 6:
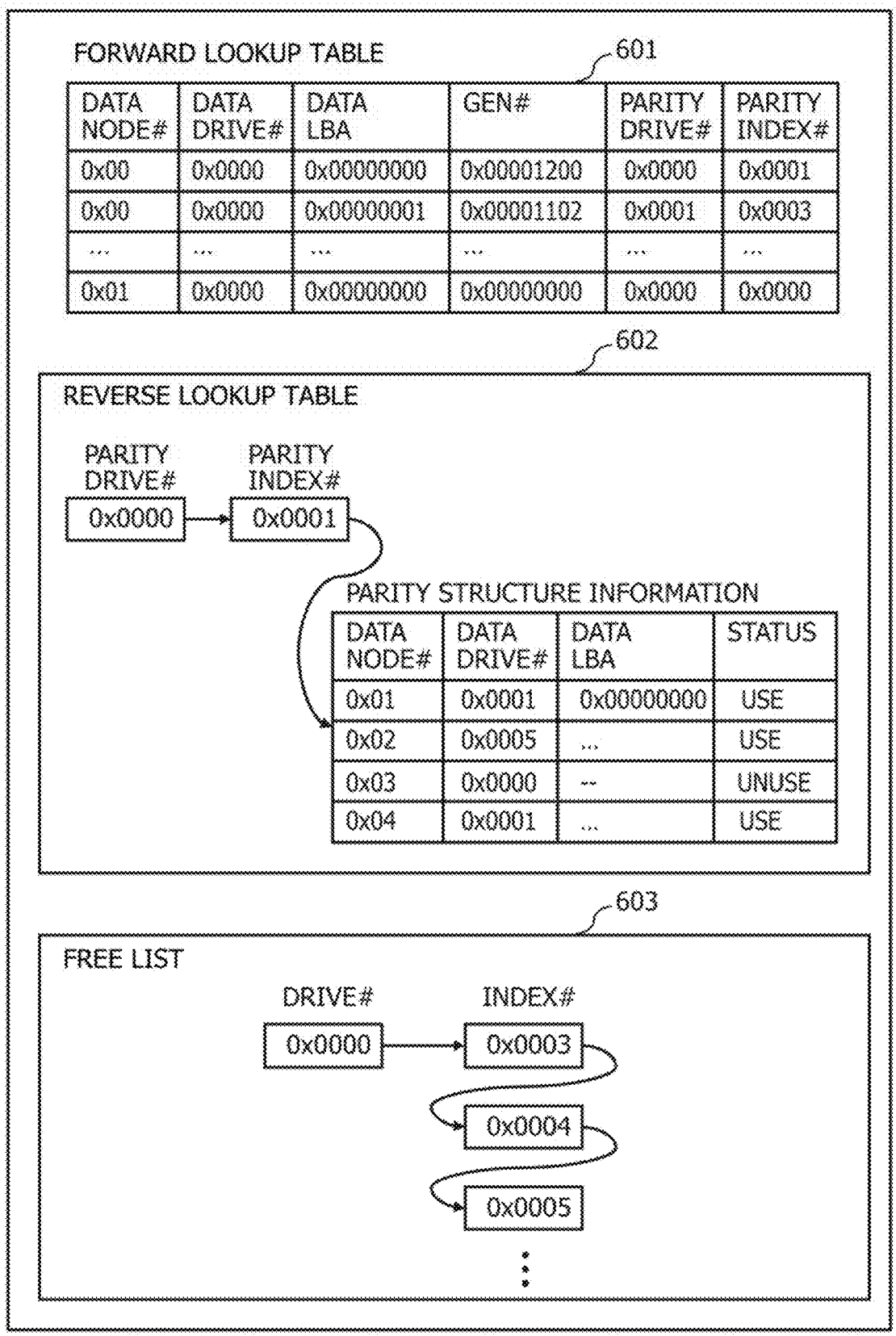
FIG. 6 is a view depicting a configuration of a parity management table.

FIG. 6 is a view depicting a configuration of the parity management table 303. The parity management table 303 is management information including a forward lookup table 601, a reverse lookup table 602 and a free list 603.

The forward lookup table 601 is management information for managing information for looking up a storage address of a Class2 code using a storage address of a data block as a key. An operation for looking up a storage address (PARITY LBA) of a Class2 code from a storage address (DATA LBA) of a data block is referred to as forward lookup.

The forward lookup table 601 includes a data node number, a data drive number, a data LBA, a generation number, a parity drive number and a parity index number as information. The data node number, data drive number and data LBA are a number of a node, a number of a drive and an LBA in which a data block is placed, respectively. The generation number is a number for managing a generation in which a data block is written out and is updated when the data block is updated. The generation number is used in a rollback process when a failure occurs with a data store node. The parity drive number is a number of a drive into which a Class2 code corresponding to a data block in the same row as the applicable entry is stored. The parity index number is a number indicative of a storage position of a Class2 code. The forward lookup table 601 places information corresponding to a Class2 code stored therein into a parity store node.

The reverse lookup table 602 is management information for managing information for looking up a storage address (DATA LBA) of the data block with which Class2 code is calculated using a storage address (PARITY LBA) of the applicable Class2 code. An operation for looking up a storage address of a data block from a storage address of a Class2 code is referred to as reverse lookup.

The reverse lookup table 602 includes a parity drive number, a parity index number and parity configuration information. The reverse lookup table 602 manages, for a unique Class2 code, a storage position of a data block that configures the Class2 code. The parity drive number and the parity index number are a drive number in which the Class2 code is stored and a number indicative of a storage position. The parity configuration information includes a data node number, a data drive number, a data LBA and a state. The data node number, data drive number and data LbA indicate storage position information of the data block from which the corresponding Class2 code is calculated. A row used in the parity configuration information (hereinafter referred to as slot) corresponds to the number of m of the data protection setting mDnP and increases or decreases slots to be used in accordance with scaling of the EC group. The state indicates a state of a data block from which the Class2 code is calculated, and an in-use state (USE) and an unused state (UNUSE) are available as states. In the case where the state indicates unused, a data block is not written in the applicable slot of the applicable Class2 code as yet and a Class2 code is calculated assuming that the applicable data block is 0 data.

The free list 603 is management information for managing a Class2 code by log-structure mapping. A Class2 code calculated newly is written out to the acquired writing destination from the free list. When a Class2 code is erased by scaling of an EC group or garbage collection, the address having been used by the erased Class2 code is added to the free list.

FIG. 7 is a view depicting a configuration of the node state management table 304. The node state management table 304 manages an operating state of the nodes. The node state management table 304 manages information of a data node number, a data drive number, a progress pointer and a node state in an associated relationship with each other.

The node state manages the state of a node identified with a node number associated with the applicable node state. As the node state, NORMAL, ERROR and RECLUSTERING are available. NORMAL indicates that the applicable node is in a normal state, and ERROR indicates that the applicable node is in a failed state. RECLUSTERING indicates that the applicable node is under reconstruction of an EC cluster by increase or decrease of a node or EC group scaling.

The progress pointer indicates a progress situation of recovery from a failure state or a progress situation of EC cluster reconstruction of a node and a drive identified with a node number and a drive number associated with the applicable progress pointer. The progress pointer indicates an LBA of the applicable drive of the applicable node and indicates that recovery from a failure or a cluster re-construction process is completed up to the LBA indicated by the progress pointer. Therefore, during recovery from a failure or during cluster reconstruction, the progress pointer is referred to determine a storage destination node of a Class2 code corresponding to the reading out destination or writing destination data block.

For example, in the case where the cluster re-construction process is executed in the ascending order of the number of the LBA, since cluster reconstruction is completed for LBAs smaller than the LBA indicated by the progress pointer, a storage destination node of a Class2 code is determined on the basis of a new stripe mapping table. On the contrary, since the cluster reconstruction is not completed for LBAs greater than the LBA indicated by the progress pointer, a storage destination node of a Class2 code is determined on the basis of an old stripe mapping table.

An update process for the stripe mapping table 301 and the reverse lookup table 602 of the parity management table 303 when the data number (D number) and the node number are increased simultaneously, namely, when the EC group is scaled up is described with reference to FIGS. 8A and 8B.

Figure 8A:
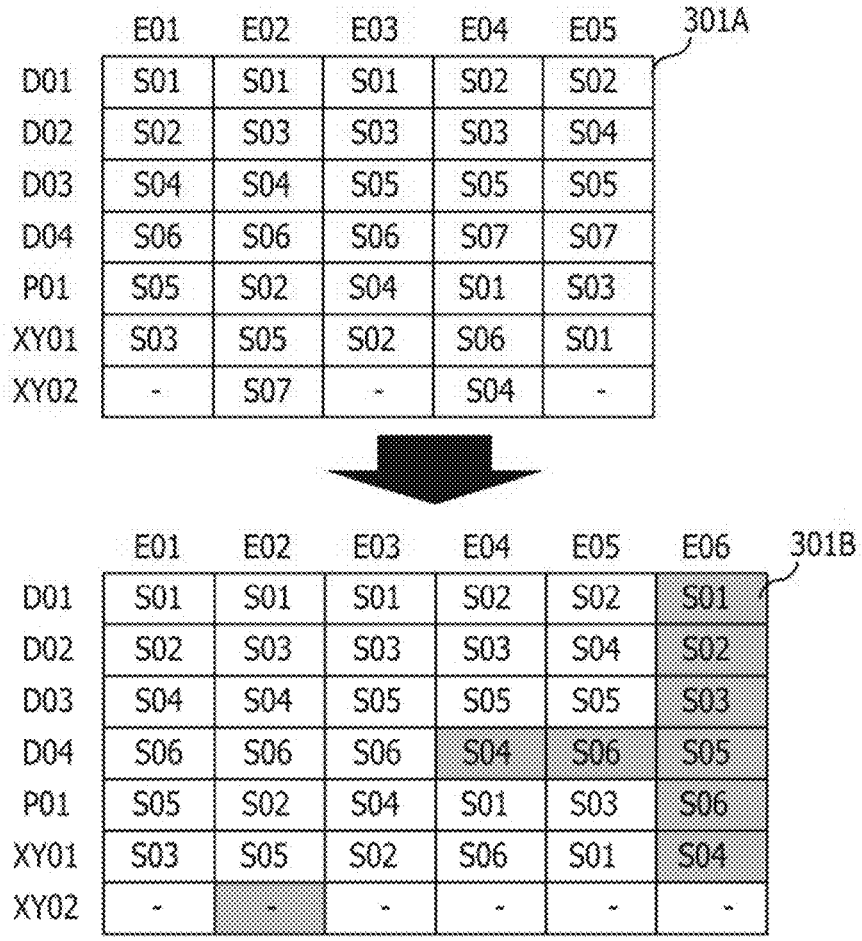
FIG. 8A is a conceptual view depicting an example of update of the stripe mapping table when the data number and the node number are increased simultaneously.

FIG. 8A is a conceptual view depicting an update example of the stripe mapping table 301 when the data number and the node number are increased simultaneously. A stripe mapping table 301A is the stripe mapping table 301 before EC group scaling up, and a stripe mapping table 301B is the stripe mapping table 301 after EC group scaling up.

The stripe mapping table 301A indicates that, in the distributed storage system 100, a cluster is configured from five nodes (E01 to E05). The configuration of the EC group is 3D2P, and the cycle number C is 4.

A change example of the stripe mapping table 301 when a sixth node (E06) is added to this cluster configuration and further the EC group is scaled up from 3D2P to 4D2P is depicted.

First, the controller 107 adds a column (E06) for the sixth node to the existing stripe mapping table 301A.

Then, the controller 107 allocates a stripe group number to the added sixth column (E06). In the following, an example of an allocation method of a stripe group number to the added column is described.

(1) The controller 107 selects, for the data part, a stripe group number or numbers (S01, S02, S03, S05) to which the allocation number to the data number is smaller than the D number after scaling up (four) and allocates the stripe group number or numbers to the added column (E06) such that the total number of stripe group numbers to be allocated within the data part including the added column becomes the D number after scaling up (four).

(2) If a number or numbers (S04, S06, S07) with which the allocation number of stripe group numbers to the data part is smaller than the D number (four) after scaling up exist, then the controller 107 erases the stripe group number (S07) to which the allocation number is smallest from among the stripe group numbers and changes the number to a different number (S04, S06) with which the allocation number is smaller than the D number (four) after scaling up.

(3) The controller 107 selects (S06) a stripe group number to which the allocation number is 0 for the Class1 code part and allocates the stripe group number to the added column (E06) such that the total allocation number in the Class1 code part including the added column (E06) becomes equal to the P number after scaling up-one (one).

(4) The controller 107 selects a column to which the allocation number of stripe group numbers is greater than that to the other columns to the Class2 code part, selects (S04), from among stripe group numbers allocated to the applicable column, a stripe group number that does not overlap with the stripe group numbers allocated in (1) to (3) above for the added column (E06), and moves the selected stripe group number to the added column.

Figure 8B:
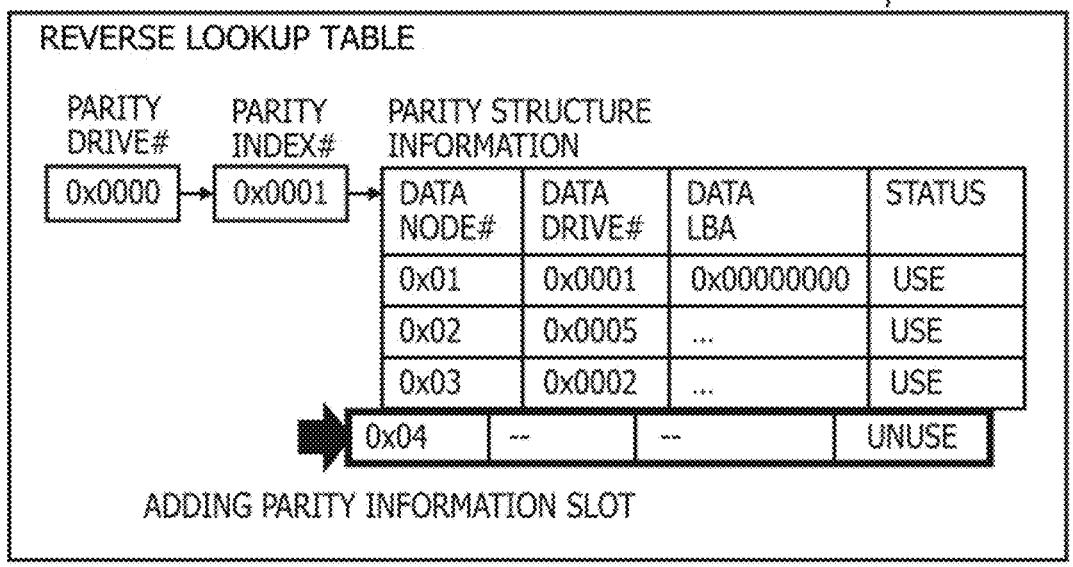
FIG. 8B is a conceptual view depicting an example of update of a reverse lookup table when the data number and the node number are increased simultaneously.

FIG. 8B is a conceptual view depicting an example of update of the reverse lookup table 602 when the data number and the node number are increased simultaneously. When the D number increases, the controller 107 increases slots for parity configuration information included in the reverse lookup table 602 of the parity management table 303 by a number equal to the increased number of the D number. This makes it possible to manage a number of pieces of data block position information equal to the newly increased D number in the data block configuring a Class2 code. The controller 107 handles the added slots as 0 data. Since the D number can be scaled up thereby without updating the Class2 code, the network transfer cost can be reduced. When data block write occurs into the node and the drive corresponding to the added slot, the controller 107 updates the Class2 code with the written in data block to update the information of the applicable slot.

By such change as described above, since it is possible not to change the Class2 code storage position of an existing data block as far as possible by reducing a change in regard to the data part, the data block transfer amount involved in EC group scaling up can be reduced.

An update process for the stripe mapping table 301 and the reverse lookup table 602 of the parity management table 303 when the data number (D number) and the node number are decreased simultaneously, namely when the EC group is scaled down, is described with reference to FIGS. 9A and 9B.

Figures 9A, 9B:
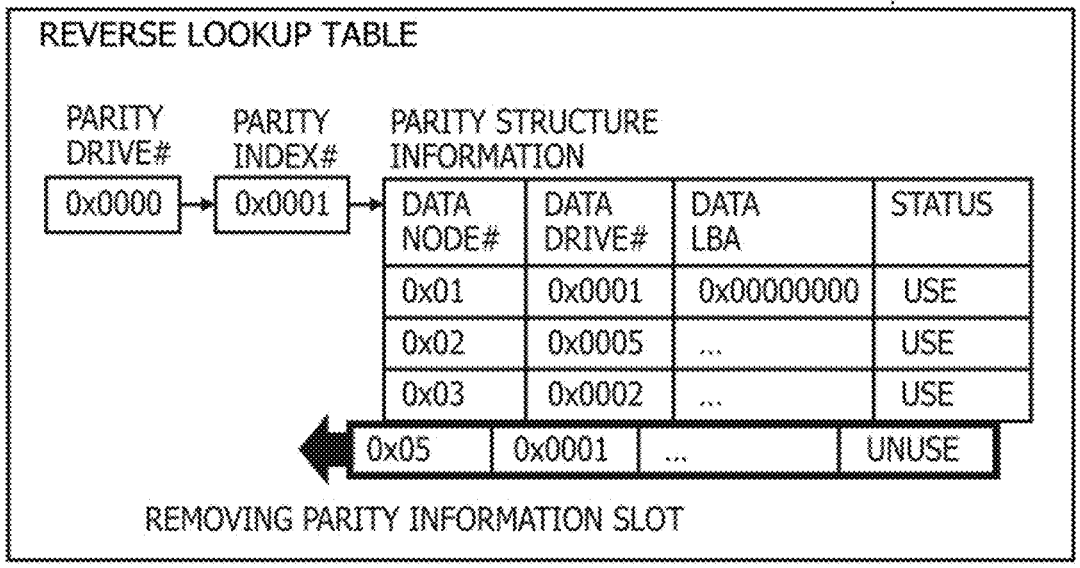
FIG. 9A is a conceptual view depicting an example of update of the stripe mapping table when the data number and the node number are decreased simultaneously.
FIG. 9B is a conceptual view depicting an example of update of the reverse lookup table when the data number and the node number are decreased simultaneously.

FIG. 9A is a conceptual view depicting an update example of the stripe mapping table 301 when the data number and the node number are decreased simultaneously. A stripe mapping table 301C is the stripe mapping table 301 before EC group scaling down, and a stripe mapping table 301D is the stripe mapping table 301 after EC group scaling down.

The stripe mapping table 301C indicates that, in the distributed storage system 100, a cluster is configured from six nodes (E01 to E06). The configuration of the EC group is 4D2P, and the cycle number C is 4.

A change example of the stripe mapping table 301 when the sixth node (E06) is excluded from this cluster configuration and further the EC group is scaled down from 4D2P to 3D2P is depicted.

First, the controller 107 excludes a column (E06) for the sixth node from the existing stripe mapping table 301C.

Then, the controller 107 re-allocates a stripe group number to each of the columns of the stripe mapping table 301 after the exclusion. In the following, an example of the applicable re-allocation method is described.

(1) The controller 107 selects, for the data part, a stripe group number (here, S01, S04) to which the allocation number is greater than the D number (three) after the scaling down and erases one of the stripe group numbers (S01, S04) to which the allocation number is greatest from among the stripe group numbers to change the allocation of the same to a new stripe group number (S07).

(2) The controller 107 allocates the newly added stripe group number to one column such that it does not overlap in the same column with the Class2 code part.

(3) The controller 107 moves the stripe group number (S01) allocated to the existing column (E01) such that it does not overlap in the same column in the Class2 code part.

FIG. 9B is a conceptual view depicting an update example of the reverse lookup table 602 when the data number and the node number are decreased simultaneously. When the D number decreases, the controller 107 decreases a number of slots for parity configuration information included in the reverse lookup table 602 of the parity management table 303 equal to the decreased number of the D number. Consequently, data block position information for the unnecessary D number that has become a target of the reduction in a data block configuring the Class2 code are not managed any more. At this time, the controller 107 converts the data blocks of the reduction target slots into 0 data. In particular, the controller 107 transfers a data block corresponding to the reduction target slot and updates the parity with the applicable data block. Consequently, only part of the data blocks can be excluded from the parity configuration information without breaking down and re-generating all of the Class2 codes.

As a result of the foregoing, the Class2 code storage positions of existing data blocks are not changed as far as possible to reduce the data block transfer amount involved in EC group scaling down.

Figure 10:
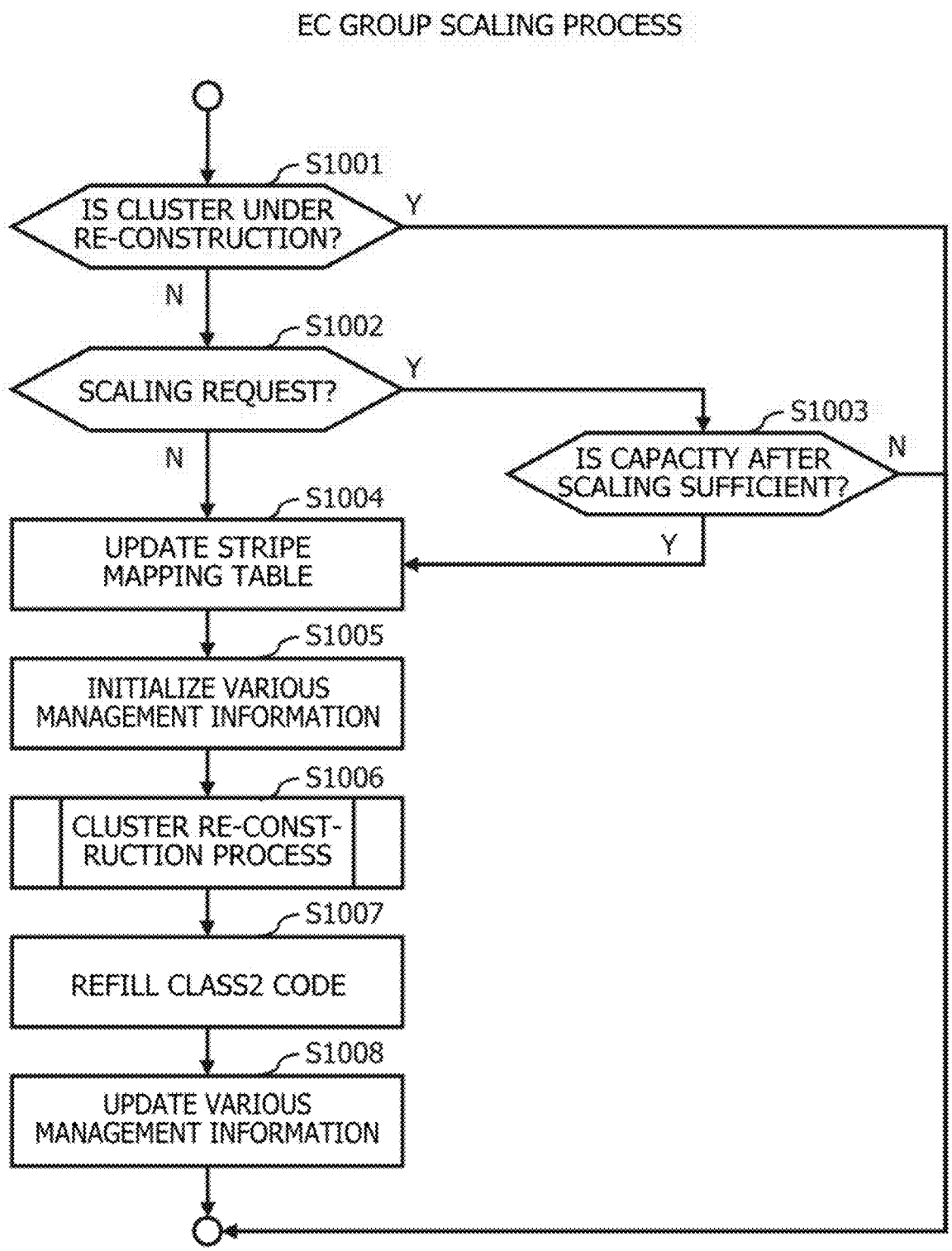
FIG. 10 is a flow chart of an EC group scaling process.

FIG. 10 is a flow chart of an EC group scaling process. The EC group scaling process is performed by the controller 107 of each node 101 executing the EC group scaling processing program 305 when the distributed storage system 100 receives a scaling request for an EC group from the user or the management program.

Processes at S1001 to S1005 of FIG. 10 are performed by the controller 107 of one of the nodes 101 of the distributed storage system 100. Although it is possible to perform the processes by two or more nodes 101, since the various management information 301 to 304 shared by all nodes 101 are updated in the process at S1004 or S1005, it is assumed that, in the present working example, one node 101 performs the processes at S1001 to S1005 in order to prevent the information from becoming inconsistent among the nodes.

For example, it is assumed that a node 101 that receives a scaling request for an EC group from the user or the management program performs the processes at S1001 to S1005. For example, in the case where one of the plurality of nodes 101 included in the distributed storage system 100 is determined as a master node and the other nodes 101 are determined as slave nodes, the master node may execute the processes at S1001 to S1005. The master nodes receives a scaling request for an EC group from the user or the management program and performs the present processes. In the case where a slave node receives a scaling request for an EC group from the user or the management program, the master node receives the scaling request for an EC group from the slave node and performs the present processes.

The controller 107 refers to the node state management table 304 to decide whether or not the cluster of the distributed storage system 100 is in a reconstruction processing state already (S1001). In particular, if the controller 107 refers to the node state management table 304 and finds that the node state of each node is "RECLUSTERING," then it decides that the cluster is in a reconstruction processing state.

If a result of the decision at S1001 indicates that the cluster is under reconstruction (S1001: Y), then the controller 107 ends the EC group scaling process. Alternatively, the controller 107 may queue the scaling request for an EC group such that, after a current cluster re-construction process is completed, it extracts and executes the queued request.

In the case where a result of the decision at S1001 indicates that a cluster is not under reconstruction (S1001: N), the controller 107 decides whether or not the scaling request for an EC group is a scaling down request (S1002). Here, the scaling down request indicates an operation for reducing a node from the cluster.

In the case where a result of the decision at S1002 indicates that the scaling request is a scaling down request (S1002: Y), the controller 107 decides whether or not there is a sufficient free space in the case where the EC group is scaled down (S1003). In the case where a node is reduced from the cluster, since the ratio of the parity part increases, if a sufficient free space does not exist and the usage rate of the data part is high, then there is the possibility that a sufficient storage capacity for the parity part may not be able to be assured after scaling down.

In the case where a result of the decision at S1003 indicates that a sufficient free space does not exist (S1003: N), the controller 107 ends the EC group scaling process. In the case where a result of the decision at S1003 indicates that a sufficient free space exists (S1003: Y), the controller 107 executes the process at S1004.

At S1004, the controller 107 updates the stripe mapping table 301 in accordance with the configuration after EC scaling down. The updated stripe mapping table 301 is sometimes referred to as new stripe mapping table. The stripe mapping table 301 before updating is sometimes referred to as old mapping table. As a term that indicates both of the new stripe mapping table and the old stripe mapping table, new and old stripe mapping tables are sometimes used. The controller 107 stores the new and old stripe mapping tables.

In the case where a result of the decision at S1002 indicates that the scaling request is not a scaling down request (S1002: N), then the controller 107 executes the process at S1004.

The controller 107 initializes the various management information 301 to 304 in preparation for the EC group scaling process. In particular, the controller 107 adds a slot number for parity configuration information in the parity management table 303 in accordance with the configuration after EC group scaling and further initializes the progress pointer in the node state management table 304. Further, the controller 107 newly generates a cache management table 302 on the basis of the new stripe mapping table (S1005).

The controller 107 of the master node transfers the various management information 301 to 304 updated at S1004 and S1005 to the other slave nodes 101 and issues a request for cluster reconstruction. The controller 107 of each node 101 executes the cluster re-construction process (S1006). Details of the cluster re-construction process executed in each node 101 are described with reference to FIG. 11.

After the cluster re-construction process ends, the controller 107 of each node 101 re-packs the Class2 codes so as to be compatible of with new stripe mapping table in the respective node 101 (S1007). In particular, since the start address of the Class2 code is changed by the change of the stripe mapping table 301, the controller 107 changes the index number of the Class2 code stored in the LBA that corresponds to the Class2 code part in the new stripe mapping table. Further, the Class2 code stored in the LBA that corresponds to the data part region in the new stripe mapping table is read out and rewritten so as to become a Class2 code part region in the new stripe mapping table.

Finally, the controller 107 updates the various management information 301 to 304. In particular, the controller 107 discards the old stripe mapping table and the old cache management table and updates the various management information 301 to 304 to the information after the EC group scaling (S1008). For example, after the controller 107 of the master node updates the various management information 301 to 304 thereof, it may transfer the updated various management information 301 to 304 to the other slave nodes to synchronize them.

Figure 11:
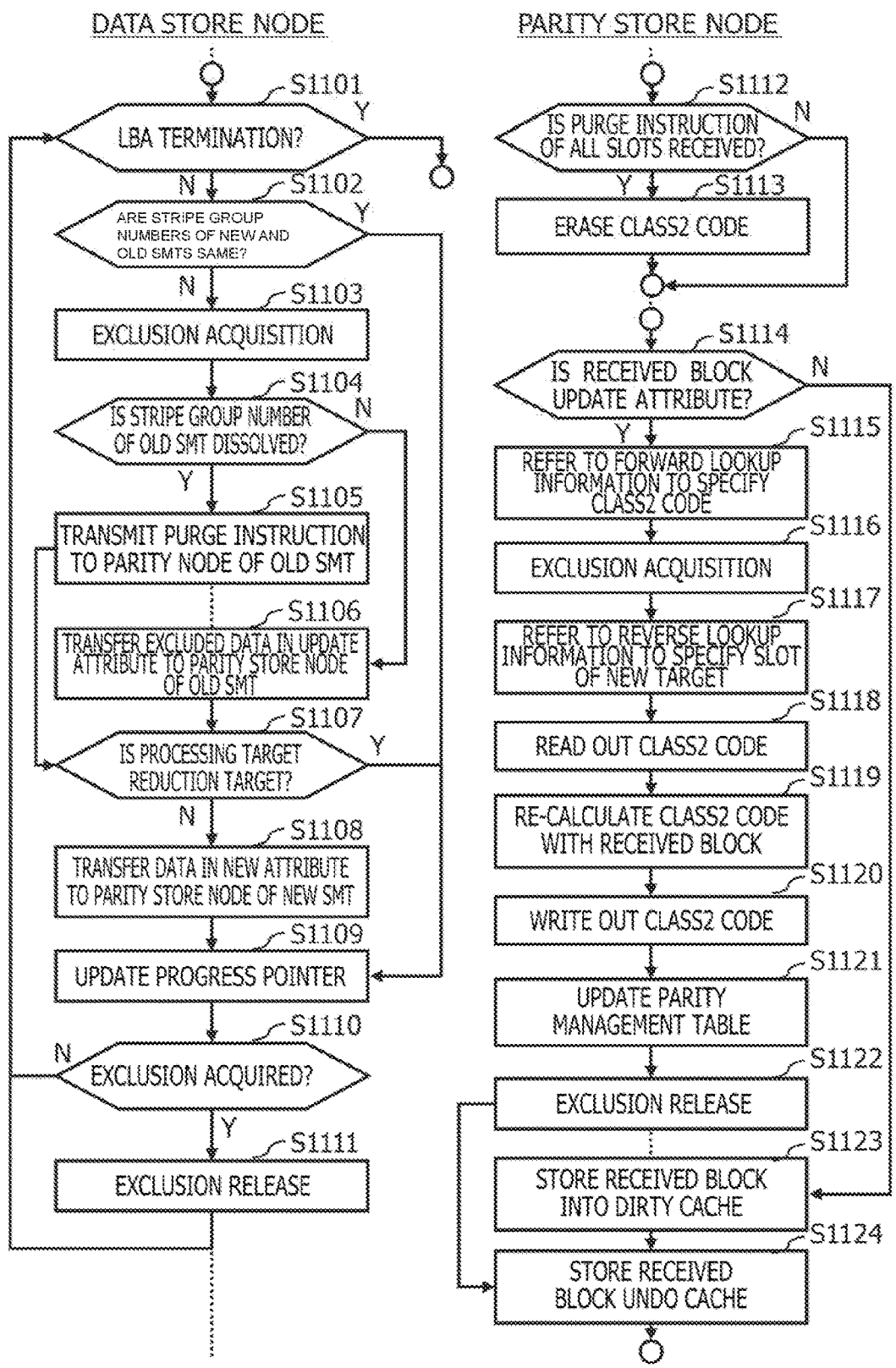
FIG. 11 is a flow chart of a cluster re-construction process.

FIG. 11 is a flow chart of the cluster re-construction process. The cluster re-construction process is part (S1006) of the EC group scaling process of FIG. 10 and is executed by the controller 107 of each node 101. The cluster re-construction process is a reconstruction process of a cluster involved in scaling of the EC group. In particular, the cluster re-construction process compares the new and old stripe mapping tables with each other and updates, for a data block that indicates a change of the stripe group number, the Class2 code corresponding to the applicable data block so as to follow up the new stripe mapping table. It is to be noted that the term SMP signifies the stripe mapping table 301.

In the following description, it is assumed that, when a data block of a certain stripe is determined as a processing target, a node 101 in which a data block of the applicable stripe is stored is determined as a data store node, and each node 101 in which the Class2 code of the stripe group to which the applicable stripe belongs is determined as parity store node.

First, a flow chart of the cluster re-construction process by the data store node is described. The controller 107 of the data store node executes the following cluster re-construction process for the stripes the own node has successively determining the stripes in the ascending order of the LBA as a processing target.

The controller 107 refers to the progress pointer of the node state management table 304 to confirm whether the processing target is the LBA termination (S1101).

In the case where a result of the confirmation at S1101 indicates that the processing target is not the LBA termination (S1101: N), the controller 107 confirms whether or not the stripe group number corresponding to the LBA of the processing target is same between the new stripe mapping table and the old stripe mapping table (S1102).

In the case where a result of the confirmation at S1102 indicates that the stripe group number corresponding to the LBA of the processing target is same between the new and old stripe mapping tables (S1102: Y), the controller 107 performs no process and updates the progress pointer to advance its processing to a next LBA (S1109).

In the case where a result of the confirmation at S1102 indicates that the stripe group number corresponding to the LBA of the processing target is different between the new and old stripe mapping tables (S1102: N), the controller 107 acquires exclusion of the LBA of the processing target (S1103).

The controller 107 confirms whether the stripe group number in the old stripe mapping table is released in the new stripe mapping table (S1104). The term release signifies a state in which a stripe group number allocated in the old stripe mapping table is not allocated in the new stripe mapping table.

In the case where a result of the confirmation at S1104 indicates that the stripe group number allocated in the old stripe mapping table is released (S1104: Y), since the Class2 code of the parity store node corresponding to the applicable stripe group number is unnecessary, the controller 107 discards the Class2 code. The controller 107 issues a purge instruction of the Class2 code of the data block of the LBA to the parity store node corresponding to the old stripe mapping table (S1105). A flow chart of the parity store node that receives the purge instruction is hereinafter described.

In the case where a result of the confirmation at S1104 indicates that the stripe group number allocated in the old stripe mapping table is not released (S1104: N), since the data block of the LBA of the processing target configuring the Class2 code of the parity store node corresponding to the applicable stripe group number is unnecessary, the controller 107 excludes the data block from the data blocks configuring the Class2 code. The controller 107 transfers the data block (exclusion data) of the exclusion target in an update attribute to the parity store node corresponding to the old stripe mapping table (S1106). A flow chart of the parity store node that receives the exclusion data is hereinafter described.

The controller 107 confirms whether the drive 105 of the processing target is a drive of the reduction target (1107). In the case where a result of the confirmation at S1107 indicates that the drive 105 of the processing target is not a reduction target (S1107: N), the controller 107 reads out a data block stored in the LBA of the processing target and transfers the data block with a new attribute in order to generate a Class2 code to the parity store node corresponding to the new stripe mapping table (S1108). The controller 107 updates the progress pointer (S1109). Also in the case where a result of the confirmation at S1107 is a reduction target (S1107: Y), the controller 107 executes S1109.

The controller 107 confirms whether or not exclusion of the LBA of the processing target is acquired (S1110). In the case where a result of the confirmation at S1110 indicates that exclusion of the LBA of the processing target is acquired (S1110: Y), the controller 107 releases the exclusion of the LBA of the processing target and advances the processing to a next LBA (S1111). In the case where a result of the confirmation at S1110 indicates that exclusion of the LBA of the processing target is not acquired (S1110: N), the controller 107 advances the processing to a next LBA (S1111).

In the case where a result of the confirmation at S1101 indicates that the processing target is the LBA termination (S1101: Y), the controller 107 ends the cluster re-construction process of the data store node.

Now, a flow chart of the cluster re-construction process in the parity store node is described.

First, a process executed when the parity store node receives a purge instruction is described. If a purge instruction is received, then the controller 107 of the parity store node acquires parity configuration information corresponding to the data block of the purge target, updates the state of the slot of the data block of the purge target to purging (PURGING) and confirms whether all slots are during purging or unused (FREE) (S1112). In the case where a result of the confirmation at S1112 indicates that a slot in use (USING) remains (S1112: N), the controller 107 ends the processing. In the case where a result of the confirmation at S1112 indicates that all slots are during the purge or unused (FREE), since the applicable Class2 code is no more used by any node, the controller 107 erases the Class2 code and ends the processing (S1113). In the erasure of the Class2 code, the controller 107 erases the target entries in the forward lookup table 601 and the reverse lookup table 602 of the parity management table 303 and inserts the LBA in which the Class2 code of the erasure target has been stored into the free list 603.

Now, a process when the parity store node receives a data block with a new attribute or an update attribute is described. If the controller 107 of the parity store node receives a data block, then it confirms whether the received block has an update attribute (S1114).

In the case where a result of the confirmation at S1114 indicates that the block does not have an update attribute but has a new attribute (S1114: N), since the controller 107 receives new write data, it stores the received block into the dirty cache (S1123). The stored dirty cache is processed in accordance with a host I/O processing program of the parity store node as hereinafter described with reference to FIG. 12.

In the case where a result of the confirmation at S1114 indicates that the block has an update attribute (S1114: Y), since the received data block is exclusion data or an intermediate code, the controller 107 updates the Class2 code stored using the received block by Read Modify Write.

First, the controller 107 refers to the forward lookup table 601 to specify a Class2 code of an update target (S1115). In particular, the controller 107 refers to the storage position information of the received block and refers to an entry of the forward lookup table 601 corresponding to the applicable storage position information to specify a Class2 code storage position.

Then, the controller 107 acquires exclusion of the LBA that is the storage position of the specified Class2 code (S1116). The controller 107 acquires the reverse lookup table 602 to specify a slot of an update target (S1117). In particular, the controller 107 refers to an entry of the reverse lookup table 602 corresponding to the specified storage LBA of the Class2 code to specify a slot coincident with the storage position information of the received block from the parity configuration information in the entry referred to.

The controller 107 reads out the Class2 code of the update target from the drive 105 (S1118), performs XOR calculation between the read out Class2 code and the received block to update the Class2 code (S1119). The controller 107 stores the updated Class2 code into the drive 105 (S1120).

The controller 107 updates the reverse lookup table 602 of the parity management table 303 (S1121). In particular, the controller 107 erases information of a slot of a target of exclusion data within the parity configuration information in the reverse lookup table. In the case where the received block is an intermediate code, update of the parity management table 303 is not performed.

The controller 107 releases the exclusion acquired at S1116 (S1122). Finally, the controller 107 stores the received block into the undo cache and ends the processing (S1124).

Figure 12:
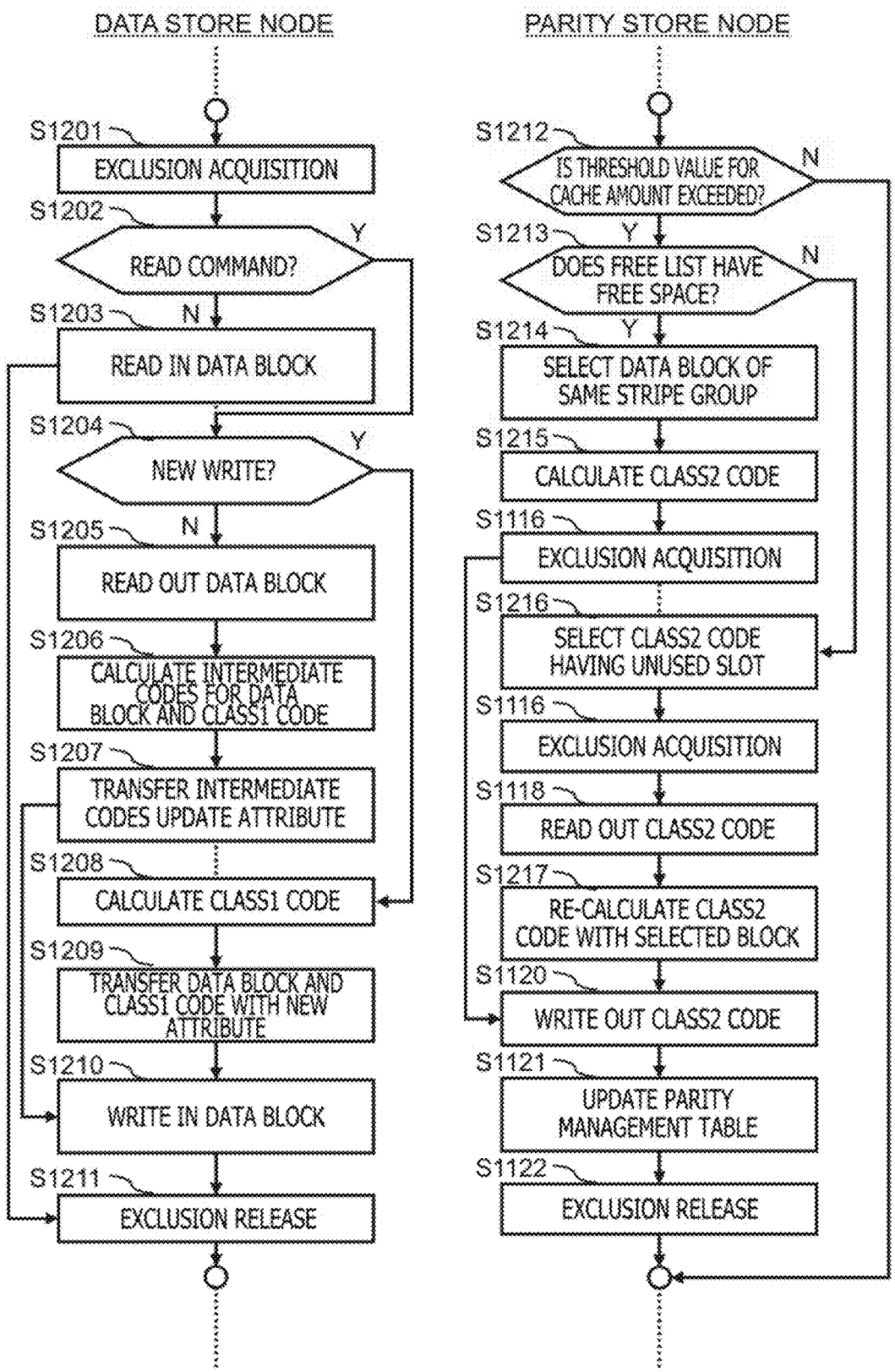
FIG. 12 is a flow chart of a host I/O process.

FIG. 12 is a flow chart of the host I/O process. When an I/O request is received from a host such as an application program or a virtual machine, the controller 107 of the node 101 executes the host I/O processing program 306 to start the host I/O process.

First, the host I/O process executed by the controller 107 of a node (data store node) that receives an I/O request is described.

The controller 107 specifies a data block position (storage destination of a data block) that becomes an I/O processing target from the received I/O request and acquires exclusion of the data block position (S1201). This prevents data inconsistency from occurring even in a case in which the I/O process is processed in parallel.

The controller 107 decides whether or not the I/O request is a reading out process (S1202). In the case where a result of the confirmation at S1202 indicates that the I/O request is a reading out process (S1202: Y), the controller 107 reads out the data block of the request target from the drive 105 and transfers the read out data block to the host (S1203). Finally, the controller 107 releases the acquired exclusion and ends the processing (S1210).

In the case where a result of the confirmation at S1202 indicates that the I/O request is not a reading out process but a write process (S1202: N), the controller 107 decides whether the write process is new write (S1204). In the case where a result of the confirmation at S1204 indicates that the write process is new write (S1204: Y), the controller 107 calculates Class1 codes (S1208). It is to be noted that, in the case where the configuration of the stripe group is mDnP, a number of such Class1 codes equal to n−1 are generated.

In the case where a result of the confirmation at S1204 indicates that the I/O request is not new write but update write (S1204: N), the controller 107 reads out a data block stored in the write destination address from the drive 105 (S1205) and calculates an intermediate code of the data block from the read out data block and the write data. Similarly, the controller 107 calculates an intermediate code of the Class1 codes (S1206).

A calculation method of an intermediate code of a Class1 code is described. The calculation method of an intermediate code of a Class1 code differs depending upon the block size of the written in write data block and whether the write is new write or update write. The intermediate code (Px) of a Class1 code is calculated in the following manner.

$$Px = P1' + P1 \quad \text{[Expression 1]}$$

Here, Px is an intermediate code of the Class1 code; P1' is the Class1 code generated from the new write data block; and P1 is the Class1 code generated from the data block written out to the drive 105 already. An XOR operation relating to the expression 1 to the expression 5 is represented merely as "+."

As an example, a calculation method of an intermediate code (Px) of a Class1 code in the case where the configuration of a stripe group is 4D2P and four data blocks are written in by new write is given below.

$$Px = \quad \text{[Expression 2]}$$
$$P1' + P1 = (D1' + D2' + D3' + D4') + (0 + 0 + 0 + 0) =$$
$$D1' + D2' + D3' + D4'$$

Here, the four data blocks of the new write target are D1', D2', D3' and D4'. 0 represents 0 data.

As an example, a calculation method of an intermediate code (Px) of a Class1 code in the case where the configuration of a stripe group is 4D2P and two data blocks are written in by new write.

$$Px = P1' + P1 = \quad \text{[Expression 3]}$$
$$(D1' + D2' + 0 + 0) + (0 + 0 + 0 + 0) = D1' + D2'$$

Here, the two data blocks of the new write target are D1' and D2'.

In the case of new write, a stripe other than the data block of the new write target is handled as 0 data, and an intermediate code (Px) of the Class1 code is generated. Since XOR operation of 0 data does not have an influence on a result, the calculation is such as given hereinabove. Also where the number of data blocks of a new write target is one block or three blocks, similar calculation can be applied.

As an example, a calculation method of an intermediate code (Px) of a Class1 code in the case where the configuration of a stripe group is 4D2P and four data blocks are written in by update write is given below.

$$Px = P1' + P1 = \quad \text{[Expression 4]}$$
$$(D1' + D2' + D3' + D4') + (D1 + D2 + D3 + D4) =$$
$$M1 + M2 + M3 + M4$$

Here, the four data blocks of the update write target are D1', D2', D3' and D4'. Further, the data blocks written in the drive 105 already are D1, D2, D3 and D4. Further, intermediate codes to be calculated from the data blocks of the update write target and the data blocks stored in the write destination of the data blocks are M1, M2, M3 and M4. M1, M2, M3 and M4 are calculated by D1'+D1, D2'+D2, D3'+D3 and D4'+D4, respectively.

As an example, a calculation method of an intermediate code (Px) of a Class1 code in the case where the configuration of a stripe group is 4D2P and two data blocks are written in by update write is given below.

$$Px = P1' + P1 = (D1' + D2' + D3 + D4) + \quad \text{[Expression 5]}$$
$$(D1 + D2 + D3 + D4) = M1 + M2$$

Here, the two data blocks of the update write target are D1' and D2'. Further, the data blocks written in the drive 105 already are D1, D2, D3 and D4. Further, intermediate codes to be calculated from the data blocks of the update write target and the data blocks stored in the write destination of the data blocks are M1 and M2. M1 and M2 are calculated by D1'+D1 and D2'+D2, respectively.

In the case of update write, by performing XOR calculation between the data blocks of the update write target and the existing data blocks, an intermediate code (Px) of the Class1 code is generated. Since XOR operation of same data becomes 0 data and does not have an influence on a result, the calculation is such as given hereinabove. Also where the number of data blocks of an update write target is one block or three blocks, similar calculation can be applied.

By calculating an intermediate code (Px) of a Class1 code by a suitable calculation method for each write pattern in such a manner as described above, the number of times of XOR calculation is decreased and the parity calculation processes is speeded up.

The controller 107 refers to the stripe mapping table 301 to determine a destination node representative of a storage destination of a Class2 code and transfers the intermediate code of the data block calculated at S1206 and the intermediate code of the Class1 code to the destination node. Upon data transfer, the controller 107 attaches information of an update attribute and transfers the intermediate code (S1207).

The controller 107 refers to the stripe mapping table 301 to determine a destination node representative of a storage destination of a Class2 code and transfers the Class1 code calculated at S1208 and the data blocks to the destination node. Upon data transfer, the controller 107 attaches information of a new attribute and transfers the Class1 code and the data blocks (S1209).

It is to be noted that, at S1207 and S1209, when the controller 107 refers to the node state management table 304, in the case where the node state is cluster reconstruction in progress, the controller 107 refers to the progress pointer to confirm whether the cluster reconstruction at the data storage destination address is completed already. In the case where the cluster reconstruction at the data storage destination address is completed, the controller 107 determines a destination node in accordance with the new stripe mapping table. In the case where the cluster reconstruction at the data storage destination address is not completed as yet, the controller 107 determines a destination node in accordance with the old stripe mapping table.

The controller 107 writes the received write data block into the local drive 105 (S1210). Finally, the controller 107 releases the exclusion of the data block position acquired at S1201 and ends the host I/O process in the data store node (S1211).

Now, the host I/O process executed by the controller 107 of the parity store node that is a destination node is described. The present process may be executed asynchronously with the consumption amount of the cache capacity confirmed periodically or may be executed synchronously with a host I/O process in the data store node (in the case of a write process) with the present process activated in opportunity when parity generation data is received by data transfer at S1207 or S1209.

The controller 107 confirms whether the cache consumption amount exceeds a threshold value (S1212). In the case where a result of the confirmation at S1212 indicates that the cache consumption amount does not exceed the threshold value (S1212: N), the controller 107 ends the host I/O process in the parity store node.

In the case where a result of the confirmation at S1212 indicates that the cache consumption amount exceeds the threshold value (S1212: Y), the controller 107 confirms whether there is a free space in the free list 603 (S1213).

In the case where a result of the confirmation at S1213 indicates that the free list 603 does not have a free space (S1213: N), since a write destination for a new Class2 code cannot be assured, the controller 107 selects, among the existing Class2 codes, a Class2 code in which several slots of the parity configuration information are not used as yet and updates the data block of a destage target to the Class2 code by Read Modify Write. First, the controller 107 refers to the parity configuration information to select a Class2 code in which several slots are not used (S1216). Then, the controller 107 acquires exclusion of the Class2 code of the update target (S1116) and reads out the selected Class2 code from the drive (S1118). Then, the controller 107 selects data blocks corresponding to the unused slots from among the data blocks stored in the dirty cache and uses the selected data block to update the Class2 code (S1217). For example, in the case where a slot corresponding to the drive number 0x0000 connected to the data store node number 0x03 from within the parity configuration information is not used as yet as depicted in FIG. 6, a data block copied from the data block stored in the drive number 0x0000 connected to the data store node number 0x03 is selected from among the data blocks stored in the dirty cache.

Then, the controller 107 writes out the updated Class2 code into the drive 105 (S1120) and updates the parity management table (S1121). In particular, the controller 107 updates an entry of the forward lookup table 601 corresponding to the data block used for the update with a write out destination address of the updated Class2 code. Further, the controller 107 updates the unused slot of the entry of the reverse lookup table 602 corresponding to the updated Class2 code with the storage position information of the data block used for the recalculation of the Class2 code. Finally, the controller 107 releases the acquired exclusion and ends the processing (S1122).

In the case where a result of the confirmation at S1213 indicates that the free list 603 has a free slot (S1213: Y), since a write out destination of the new Class2 code can be assured, the controller 107 calculates a new Class2 code with a plurality of data blocks and writes out the new Class2 code to the drive 105. First, the controller 107 acquires a write out destination of the Class2 code from the free list 603 and selects a data block of a same stripe group number or a Class1 code from the dirty cache table 501 (S1214). The data block or the Class1 code to be selected may be an arbitrary block if the stipe group number is same. Then, the controller 107 calculates a Class2 code from the selected data block or the Class1 code (S1215). In the case of mDnP, n such Class2 codes are generated. Then, the controller 107 acquires exclusion of the write destination address (S1116) and writes out the Class2 code (S1120).

Then, the controller 107 updates the parity management table 303 (S1121). In particular, the controller 107 updates the entry of the forward lookup table 601 corresponding to the selected data block with the acquired write out destination address and further updates the entry of the reverse lookup table 602 corresponding to the acquired write destination address of the Class2 code with the storage position information of the data block used for the calculation of the Class2 code. Finally, the controller 107 releases the exclusion acquired at S1116 and ends the host I/O process in the parity store node (S1122).

Figure 13:
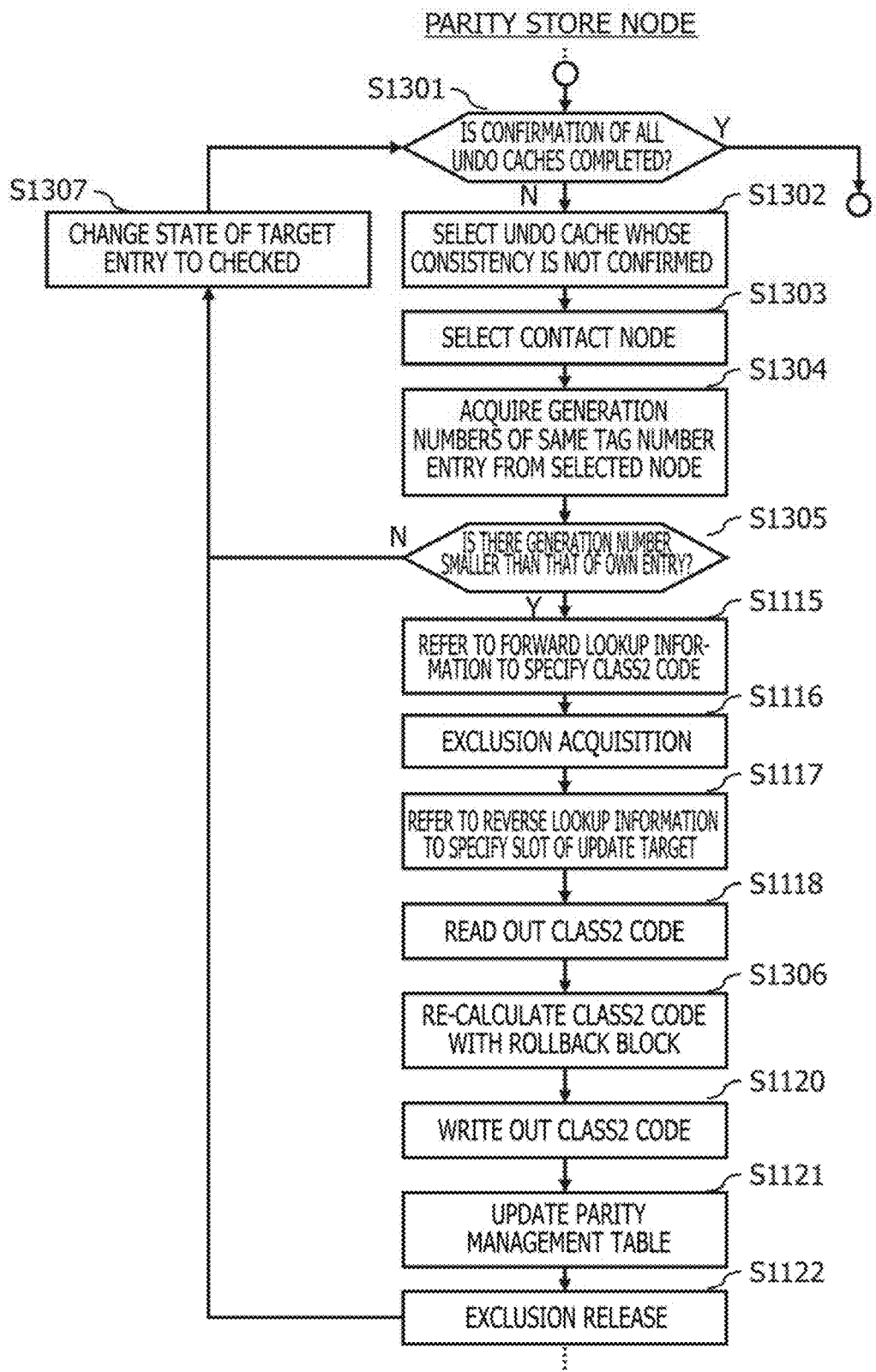
FIG. 13 is a flow chart of a rollback process.

FIG. 13 is a flow chart of the rollback process. When a failure occurs with the data store node, the controller 107 of each parity store node in which a parity block (Class2 code) of a data store node with which the failure occurs executes a rollback process by executing a rollback processing program 307. In the rollback process, when a failure occurs with a data store node, the consistency of the Class2 code is confirmed between parity store nodes, and in the case where inconsistency is found, a process for establishing consistency of the Class2 code is performed.

First, the controller 107 refers to the state of the undo cache table 502 to confirm whether or not confirmation of the consistency is obtained in regard to all entries (S1301). In the case where a result of the confirmation at S1301 indicates that consistency is not obtained in regard to all entries (S1301: N), the controller 107 selects one of cache entries whose consistency is not confirmed as yet (S1302).

Then, the controller 107 selects a different parity store node (inquiry destination node) from which consistency is to be obtained from the I/O range information of the selected entry (S1303). In particular, the controller 107 specifies a data block that has become a write target from the start address in the I/O range and the data transfer length. In the case where the write destination spans a plurality of data blocks, the controller 107 determines a different parity store node in which the Class2 codes of the data blocks are stored as an inquiry destination node. For example, in the case where the start address is 0x00000000, the data transfer length is 16 KB and the data block unit is 4 KB, four blocks beginning with the address 0x00000000 are an update target. Therefore, stripe group numbers of the four blocks are determined from the stripe mapping table 301 to select an inquiry destination node.

Then, the controller 107 acquires a generation number of an entry having a tag number same as the entry being currently selected from the selected inquiry destination node (S1304). The controller 107 confirms whether or not the acquired generation number is smaller than the generation number recorded in the entry of the own node (S1305).

In the case where a result of the confirmation at S1305 indicates that the acquired generation number is smaller than the generation number recorded in the entry of the own node (S1305: Y), the controller 107 decides that a parity store node that does not receive the latest write data as yet exists and rolls back the Class2 code of the own system node to establish consistency of the Class2 code. This process is similar to that of the flow chart described hereinabove with reference to FIG. 11 except that the data block used in Read Modify Write is a block for rollback (S1306) (S1115 to S1118 and S1120 to S1122). At S1306, the controller 107 uses the data block or the intermediate code stored in the cache entry of the entry being selected to Read Modify Write the Class2 code to update the Class2 code.

The controller 107 updates the state of each entry whose consistency is confirmed to confirmed (CHECKED) in the undo cache table 502 and ends the confirmation of the applicable entry, and then carries out S1301 again (S1307).

Also in the case where a result of the confirmation at S1305 indicates that the acquired generation number is not smaller than the generation number recorded in the entry of the own node (S1305: N), the controller 107 carries out S1307.

In the case where a result of the confirmation at S1301 indicates that confirmation of the consistency is obtained in regard to all entries, the controller 107 ends the rollback process (S1301: Y).

WORKING EXAMPLE 2

Figure 14:
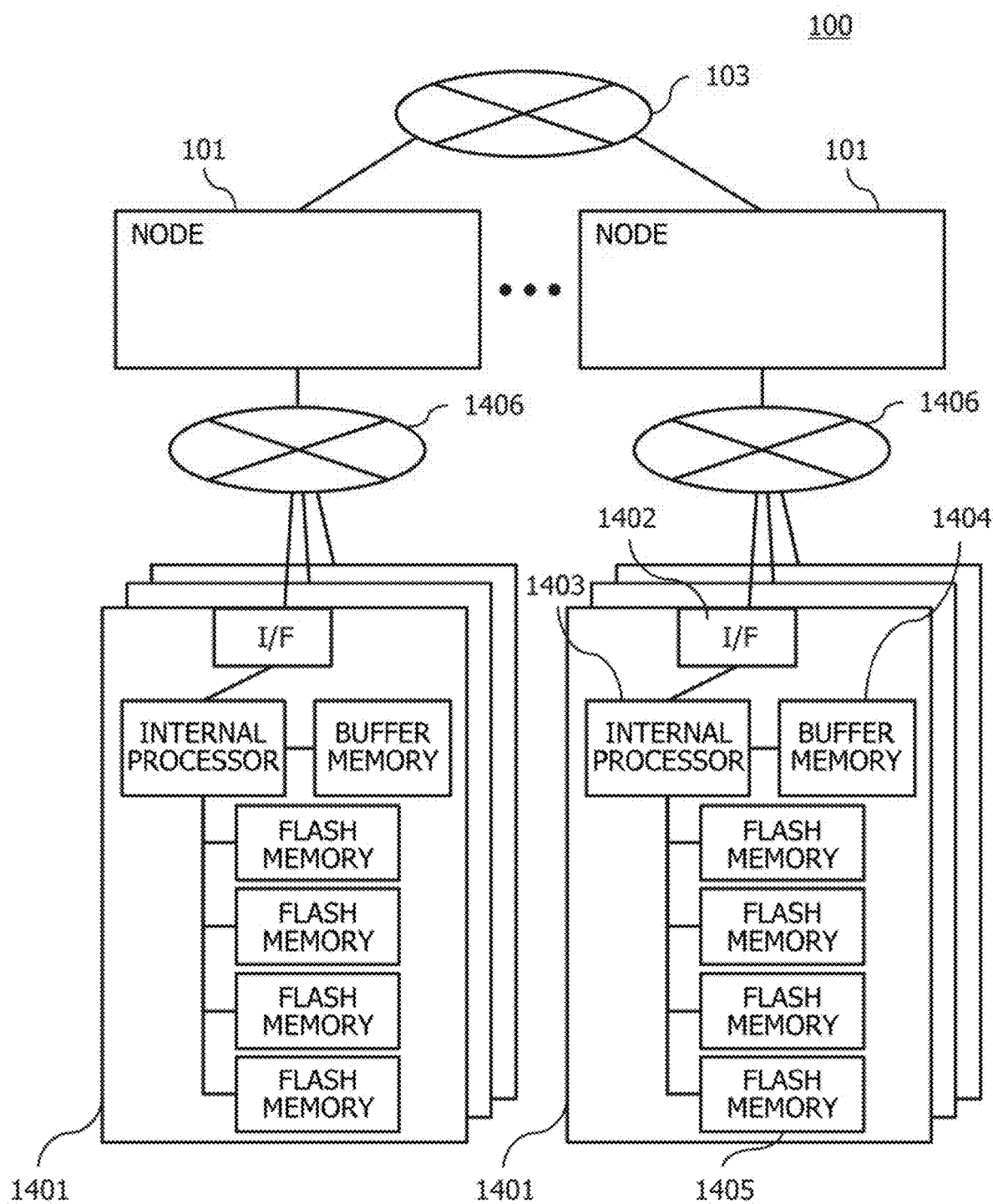
FIG. 14 is a view depicting a configuration of a distributed storage system in a working example 2.

FIG. 14 is a view depicting a configuration of a distributed storage system 100 according to a working example 2. In regard to the distributed storage system 100, a principal difference between the configuration of the working example 1 depicted in FIG. 1 and the configuration depicted in FIG. 14 in the working example 1 is that a back end port 108 of a node 101 of the working example 2 is connected to a plurality of flash drives 1401 through a virtual or physical back end network 1406 in addition to the network 103.

In the following, like components to those of the working example 1 are denoted by like reference characters, and description of them is omitted. Unless otherwise specified below especially, the various management information 301 to 304, various programs 305 to 307 and various processes (for example, the processes in FIGS. 10 to 13) described hereinabove in connection with the working example 1 are similar also in the working example 2.

In one site, one or a plurality of nodes 101 are installed. Each of the nodes 101 can communicate with each of the flash drives 1401 through the back end network 1406 without the intervention of any other node 101 and can be used as a local drive 105. One flash drive 1401 communicates with only one node 101.

The back end network 1406 may connect the plurality of nodes 101 to each other, and the nodes 101 to which the back end network 1406 is connected may communicate with each other using the back end network 1406. Communication between the nodes 101 that are not connected to each other by the back end network 1406 is performed using the network 103.

Each flash drive 1401 is configured including an interface 1402 for connecting to a node 101, a buffer memory 1404 for temporarily storing data, an internal processor 1403 for controlling the flash drive 1401 and a plurality of flash memories 1405 for storing data.

In the present working example, a calculation process of a parity block (Class1 code or Class2 code), metadata management of the applicable parity block and a data storage process in a log structure format are carried out by the flash drive 1401. Consequently, since the node 101 can carry out a write process without consciousness of generation of a parity block (Class1 code or Class2 code), construction management of the applicable parity block, and the log structured format, the processing load to the node 101 can be reduced, and a calculation resource can be allocated to an application program or a virtual machine as much.

In particular, the various management information 301 to 304 described hereinabove in connection with the working example 1 is store into the buffer memory 1404 in the flash drive 1401, and a partial program is executed by the internal processor 1403 in the flash drive 1401. The partial program is a program for executing parity calculation and metadata management of the parity, and log structured management.

It is to be noted that the present disclosure is not restricted to the working examples described above and includes various modifications. The configurations of the working example 1 and the working example 2 may be carried out in combination with a component or components of other working examples. Part of the configuration of the working example 1 or the working example 2 may be carried out in place of part of a configuration of a different working example. The working example 1 or the working example 2 may be carried out excluding part of the configuration thereof.

Further, also the following configurations are included in the technical scope of the working example 1 or the working example 2.

In the case where an EC group is to be scaled up or down, the distributed storage system 100 changes over the logical configuration of data of each node 101 from the logical configuration of the EC group before change to the configuration of the EC group after change.

The distributed storage system 100 refers to the old and new stripe mapping tables before and after scaling up or scaling down of the EC group to reconstruct the cluster of the distributed storage system 100 in response to the allocation state of stripe group numbers and the node configures of the new and old stripe mapping tables. Especially, the distributed storage system 100 compares the new and old stripe mapping tables with each other and executes, in the case where there is a data block to which different stripe group numbers are allocated in the new and old stripe mapping tables, the following processes. In the following description, the applicable data block is referred to as "target data block." As the target data block, a Class1 code may be included.

(1) When a stripe group number in the old stripe mapping table does not exist in the new stripe mapping table, the distributed storage system 100 transmits a notification for deleting a parity block (Class2 code) generated with the stripe group number in the old stripe mapping table to a parity store node. The parity store node deletes the applicable Class2 code.

(2) When a stripe group number in the old stripe mapping table exists in the new stripe mapping table, the distributed storage system 100 transmits the target data block to the parity store node. The parity store node updates the Class2 code so as to remove the target data block from the configuration of the Class2 code generated with the stripe group number in the old stripe mapping table.

(3) If the data store node into which the target data block is to be stored is not a reduction target, then the distributed storage system 100 transfers the target data block to the parity store node to generate or update the parity generated with the stripe group number in the new stripe mapping table.

The distributed storage system 100 is a system that calculates a parity with dynamically selected data and records storage position information of the selected data, and updates management information (for example, the stripe mapping table 301 and so forth) in accordance with the scaling up or scaling down of an EC group. For example, the distributed storage system 100 adds, when an EC group is to be scaled up, a new slot to the management information and initializes the new slot as 0 data. Further, when an EC group is to be scaled down, the distributed storage system 100 deletes an existing slot having 0 data therein from the management information.

The distributed storage system 100 changes over the parity calculation method of write data to an additional node between rewriting of an existing parity and generation of a new parity in response to the free capacity in a parity space. Further, the distributed storage system 100 stores a plurality of parities calculated from a same stripe into successive regions of the drive 105.

The distributed storage system 100 manages data whose parity is generated or an updated intermediate code together with a generation number and confirms, when the data store node fails, consistency of the generation number between the nodes 101, and rolls back the parity if necessary.

The distributed storage system 100 updates the stripe mapping table 301 such that the recombination of stripe groups may decrease before and after the EC group is scaled up or down. The distributed storage system 100 changes the allocation of stripe groups in order to three portions of the data transfer destination management section, a primary parity transfer destination management section and a secondary parity transfer destination management section.

When a node 101 that configures a cluster is to be increased simultaneously when an EC group is scaled up, the distributed storage system 100 incorporates cells of an additional node into a stripe group whose cell number is smaller than the D number after scaling up to recombine the stripe group. Further, the distributed storage system 100 releases a stripe group whose cell number is smaller than the D number after scaling up and incorporates cells to which the released stripe group has been allocated into a different stripe group having a cell number smaller than the D number after scaling up to recombine the stripe group. Furthermore, the distributed storage system 100 re-allocates cells of a node to which the allocation number is one-sided from among the cells of the parity allocated to existing nodes to the additional node such that stripe groups do not overlap with each other in a same node.

The distributed storage system 100 adds a new data block to data blocks configuring the parity by an RMW (Read-Modify Write) operation for an existing parity block to rewrite the parity block to a new pattern to scale up the EC group. The distributed storage system 100 carries out rewriting of the parity blocks upon write request for the additional node to commonize network transfer in EC group scaling up and network transfer for data protection upon write. By localizing a data block whose network transfer is required to the added node, the network transfer amount during EC group scaling up can be reduced.

When the nodes 101 configuring the cluster are reduced simultaneously with scaling down of an EC group, the distributed storage system 100 excludes cells allocated to the exclusion node from the stripe mapping table 301 together with the exclusion node to recombine the stripe group. The distributed storage system 100 selects several cells from within a stripe group whose cell number exceeds the D number after scaling down and recombines the new stripe group with the selected cells. The distributed storage system 100 re-allocates the cells of the parity allocated to the exclusion node to cells of an existing node to which a data block configuring the parity is not allocated.

The distributed storage system 100 executes the calculation method of the parity described above in the inside of the drive 105.

According to one mode of the present disclosure, the distributed storage system 100 reduces write penalties of a parity block recombination process upon EC group scaling down by selectively using whether an existing parity block is to be rewritten (Read Modify Write) or a new parity block is to be generated in response to an allocation state of stripe group numbers and a node configuration of the stripe mapping table 301 before and after EC group scaling. Further, by selectively using the parity block calculation method upon writing into the additional node in response to the free capacity of the parity space between update write and new write, the write penalty into the additional node is reduced. Furthermore, in an encoding method in which the storage destination number of a parity block does not rely upon the redundancy degree, the stripe mapping table 301 is updated such that the recombination number of stripes decreases before and after EC group scaling to reduce the data transfer amount between nodes. In the distributed storage system 100 that includes a plurality of storage devices, by reducing the write penalty and the network transfer amount upon EC group scaling, the time required for EC group scaling can be reduced and besides the host I/O performance can be enhanced.

When the distributed storage system 100 increases data elements of a data set (EC group, stripe group), it deploys zero data or redundant data into a new node. The distributed storage system 100 is a storage system including a plurality of nodes. Each of the plurality of nodes includes a storage device and a controller for storing data into the storage device. At least one or more controllers from among the controllers of the plurality of nodes configure a data set from a first given number of data elements configured from a plurality of data and redundant data corresponding to the plurality of data. The applicable controller distributes and deploys the first given number of data elements of the data set to a first given number of first nodes from among the plurality of nodes. If the applicable controller receives an instruction to increase the number of data elements configuring the data set by a second given number from the first given number, then the applicable controller reconstructs the data set that includes, as new data elements, the first given number of data elements of the data set and a second given number of zero data. The applicable controller controls such that the data elements of the reconstructed data set are deployed in a distributed relationship into the first given number of first nodes and the second given number of second nodes and zero data or redundant data are deployed into the second given number of second nodes from among the data elements of the reconstructed data set.

The at least one or more controllers control such that, when the data elements of the reconstructed data set are to be distributed into the first given number of first nodes and the second given number of second nodes, nodes of deployment destinations of the plurality of data from among the data elements of the reconstructed data set are same as each other. In particular, when the data elements of the data set are to be increased, since the data (user data) need not be moved to the other nodes, the data transfer amount can be reduced.

When each of the nodes in which the zero data is deployed from among the second given number of second nodes receives a first write request into each deployment destination of the zero data, the controller of the node stores first write data of the first write request into the deployment destination of the zero data and controls such that the first write data is transmitted to the nodes in which the redundant data of the reconstructed data set is deployed from among the first given number of first nodes and the second given number of second nodes. The controller of each of the nodes that receive the first write data controls such that the redundant data is updated based on the redundant data of the reconstructed data set and the first write data. When the zero data is to be rewritten, the redundant data (Class2 code) is updated by Read Modify Write.

When the redundant data is to be updated, the controller of each of the nodes that receive the first write data controls such that the redundant data is updated without using zero data and the plurality of data deployed in the other nodes than the node from which the first write data is transmitted from among the first given number of first nodes and the second given number of second nodes. Since data other than the write data and the redundant data need not be used for update of the redundant data (Class2 code), the data transfer amount can be reduced.

When a second write request in which one of the deployment destinations of the plurality of data is designated as a write destination is received, the controller of one of the nodes in which the plurality of data are deployed from among the first given number of first nodes reads out data deployed in the write destination and generates an intermediate code from second write data of the second write request and the read out data. The applicable controller updates the data deployed in the write destination based on the second write data. The applicable controller controls such that the intermediate code is transmitted to the node in which the redundant data of the reconstructed data set is deployed from among the first given number of first nodes and the second given number of second nodes. The controller of the node that receives the intermediate code controls so as to update the redundant data based on the redundant data of the reconstructed data set and the intermediate code. When data is to be rewritten, the intermediate code is used to update the redundant data (Class2 code) by Read Modify Write.

When the redundant data is to be updated, the controller of the node that receives the intermediate code controls such that the redundant data is updated without using zero data and the data deployed in the other nodes than the node from which the intermediate code is transmitted from among the first given number of first nodes and the second given number of second nodes. Since data other than the intermediate code and the redundant data need not be used for update of the redundant data (Class2 code), the data transfer amount can be reduced.

When the first given number of data elements of the data set are deployed in a distributed relationship in the first given number of first nodes, each of the first given number of first nodes has stripe mapping information for managing deployment of the first given number of data elements of the data set. At least one or more nodes from among the first given number of first nodes update, when the instruction for increasing the number of data elements configuring the data set from the first given number by the second given number is received, the stripe mapping information such that deployment of the data elements of the reconstructed data set is managed. The applicable at least one or more nodes control such that the updated stripe mapping information is transmitted to the other nodes from among the first given number of first nodes and the second given number of second nodes. Each of the first given number of first nodes and the second given number of second nodes controls so as to distribute the data elements of the reconstructed data set based on the stripe mapping information before the update and the updated stripe mapping information.

Where zero data is to be deployed into the second given number of second nodes, each of the second given number of second nodes executes at least one of a process for storing zero data into a storage device the applicable node has and a process for managing information indicative of zero data in an associated relationship with an address that is a deployment destination of zero data in the applicable node. As an alternative, where zero data is to be deployed into the second given number of second nodes, each of the second given number of second nodes does not allocate an actual storage region of a storage device the applicable node has to a logical address that is a deployment destination of zero data in the applicable node.

Each of the first given number of first nodes provides a logical volume. The plurality of data included in the data set before the reconstruction are data of a logical volume individually provided from the nodes different from each other.

Before an instruction to increase the number of data elements that configure the data set by the second given number from the first given number is received, at least the second given number of second nodes are added in addition to the plurality of nodes to perform scaling out.

Each of the first given number of first nodes and the second given number of second nodes manages a parity free capacity that is a free capacity for storing redundant data to be deployed to the node. The controller of the node (parity store node) that receives the first write data (new write data) updates and stores, where the parity free capacity of the applicable node is equal to or smaller than a given capacity, the redundant data based on the first write data and the redundant data of the reconstructed data set. On the other hand, the controller of the node that receives the first write data generates, where the parity free capacity of the applicable node is not equal to or smaller than the given capacity, redundant data of the reconstructed data set based on data elements other than the redundant data from among the data elements of the reconstructed data set and stores the generated redundant data into at least part of the parity free capacity.

Where a plurality of redundant data are included in the data elements of the reconstructed data set and the plurality of redundant data are to be deployed in a distributed manner to a number of nodes equal to the plurality of redundant data from among the first given number of first nodes and the second given number of second nodes, each of the nodes in which the plurality of redundant data are deployed manages the redundant data deployed in the applicable node and a generation number for identifying a generation of the data set when the applicable redundant data is generated or updated in an associated relationship with each other. Where a failure occurs with any of the nodes in which the data of the reconstructed data set are deployed, at least one or more of the nodes in which the redundant data are deployed acquires the generation numbers managed by the nodes in which the plurality of redundant data are deployed and decides whether or not the generation numbers managed by the other nodes are smaller than the generation number managed by the own node. The applicable at least one or more of the nodes roll back, where a result of the applicable decision indicates that the generation numbers managed by the other nodes are smaller than the generation number managed by the own node, the redundant data of the own node to the redundant data in the data set of the generation of the smallest generation number from among the generation numbers managed by the other nodes to execute a rebuild process. On the other hand, the applicable at least one or more of the nodes execute, where the result of the applicable decision indicates that the generation numbers managed by the own node are not smaller than the generation number managed by the own node, a rebuild process with the redundant data managed by the own node.

As examples of an embodiment of the present disclosure, a program for causing the at least one or more of the controllers to execute steps of (1) to (4) given below or a computer-readable recording medium on which the applicable program is recorded are included.

(1) A data set is constructed from a first given number of data elements configured from a plurality of data and redundant data corresponding to the plurality of data.

(2) The first given number of data elements of the data set are deployed in a distributed relationship into a first given number of first nodes.

(3) When an instruction to increase the number of data elements that construct the data set from the first given number by a second given number is received, the data set is reconstructed using, as new data elements, the first given number of data elements of the data set and a second given number of zero data.

(4) The data elements of the reconstructed data set are deployed in a distributed relationship into the first given number of first nodes and the second given number of second nodes and zero data or redundant data are deployed into the second given number of second nodes from among the data elements of the reconstructed data set.

As an example of an embodiment of the present disclosure, a control method for a system including a plurality of nodes, which includes steps (5) to (8) given below, is included.

(5) A data set is constructed from a first given number of data elements configured from a plurality of data and redundant data corresponding to the plurality of data.

(6) The first given number of data elements of the data set are deployed in a distributed relationship into a first given number of first nodes from among the plurality of nodes.

(7) When an instruction to increase the number of data elements that construct the data set from the first given number by a second given number is received, the data set is reconstructed using, as new data elements, the first given number of data elements of the data set and a second given number of zero data.

(8) The data elements of the reconstructed data set are deployed in a distributed relationship into the first given number of first nodes and the second given number of second nodes and zero data or redundant data is deployed into the second given number of second nodes from among the data elements of the reconstructed data set.

REFERENCE SIGNS LIST

100: Distributed storage system
101: Node
102: Internal network
103: Network
104: Memory
105: Drive
106: Processor
107: Controller
108: Back end port

The invention claimed is:

1. A storage system, comprising:
a plurality of nodes,
wherein each of the plurality of nodes includes a storage device and a controller that stores data into the storage device;
wherein at least one or more controllers from among the plurality of nodes is configured to:
construct a data set from a first given number of data elements configured from a plurality of data and redundant data corresponding to the plurality of data;
deploy the first given number of data elements, the data elements constructing the data set, in a distributed relationship into a first given number of first nodes from among the plurality of nodes;
reconstruct, when receiving an instruction to increase the number of data elements that construct the data set from the first given number by a second given number, the data set using, as new data elements, the first given number of data elements of the data set and the second given number of zero data;
control such that the data elements of the reconstructed data set are deployed in a distributed relationship into the first given number of the first nodes and the second given number of second nodes and zero data or the redundant data are deployed into the second given number of the second nodes from among the data elements of the reconstructed data set,
wherein in a case where a plurality of redundant data are included in the data elements of the reconstructed data set and the plurality of redundant data are to be deployed in a distributed manner to a number of nodes equal to the plurality of redundant data from among the first given number of the first nodes and the second given number of the second nodes, wherein each of the nodes in which the plurality of redundant data are deployed manages the redundant data deployed in the applicable node and a generation number for identifying a generation of the data set when the applicable redundant data is generated or updated in an associated relationship with each other, and wherein in a case where a failure occurs with any of the nodes in which the data of the reconstructed data set are deployed, at least one or more of the nodes in which the redundant data are deployed, acquire the generation numbers managed by the nodes in which the plurality of redundant data are deployed and decides whether or not the generation numbers managed by the other nodes are smaller than the generation number managed by the own node;

roll back, in a case where a result of the applicable decision indicates that the generation numbers managed by the other nodes are smaller than the generation number managed by the own node, the redundant data of the own node to the redundant data in the data set of the generation of the smallest generation number from among the generation numbers managed by the other nodes to execute a rebuild process; and execute, in a case where the result of the applicable decision indicates that the generation numbers managed by the own node are not smaller than the generation number managed by the own node, a rebuild process with the redundant data managed by the own node.

2. The storage system according claim 1, wherein the at least one or more controllers control such that, when the data elements of the reconstructed data set are to be distributed into the first given number of the first nodes and the second given number of the second nodes, nodes of deployment destinations of the plurality of data from among the data elements of the reconstructed data set are same as each other.

3. The storage system according claim 2, wherein when each of the nodes in which the zero data is deployed from among the second given number of the second nodes receives a first write request into each deployment destination of the zero data, the controller of the node:

stores first write data of the first write request into the deployment destination of the zero data; and controls such that the first write data is transmitted to the nodes in which the redundant data of the reconstructed data set is deployed from among the first given number of the first nodes and the second given number of the second nodes; and the controller of each of the nodes that receive the first write data controls such that the redundant data is updated based on the redundant data of the reconstructed data set and the first write data.

4. The storage system according claim 3, wherein when the redundant data is to be updated, the controller of each of the nodes that receive the first write data controls such that the redundant data is updated without using zero data and the plurality of data deployed in the other nodes than the node from which the first write data is transmitted from among the first given number of the first nodes and the second given number of the second nodes.

5. The storage system according claim 2, wherein when a second write request in which one of the deployment destinations of the plurality of data is designated as a write destination is received, the controller of one of the nodes in which the plurality of data are deployed from among the first given number of the first nodes reads out data deployed in the write destination;

generates an intermediate code from second write data of the second write request and the read out data;

updates the data deployed in the write destination based on the second write data; and controls such that the intermediate code is transmitted to the node in which the redundant data of the reconstructed data set is deployed from among the first given number of the first nodes and the second given number of the second nodes; and the controller of the node that receives the intermediate code controls so as to update the redundant data based on the redundant data of the reconstructed data set and the intermediate code.

6. The storage system according claim 5, wherein when the redundant data is to be updated, the controller of the node that receives the intermediate code controls such that the redundant data is updated without using zero data and the data deployed in the other nodes than the node from which the intermediate code is transmitted from among the first given number of the first nodes and the second given number of the second nodes.

7. The storage system according claim 1, wherein, when the first given number of data elements of the data set are deployed in a distributed relationship in the first given number of the first nodes, each of the first given number of the first nodes has stripe mapping information for managing deployment of the first given number of data elements of the data set;

at least one or more nodes from among the first given number of the first nodes update, when the instruction for increasing the number of data elements constructing the data set from the first given number by the second given number is received, the stripe mapping information such that deployment of the data elements of the reconstructed data set is managed; and control such that the updated stripe mapping information is transmitted to the other nodes from among the first given number of the first nodes and the second given number of the second nodes; and each of the first given number of the first nodes and the second given number of the second nodes controls so as to distribute the data elements of the reconstructed data set based on the stripe mapping information before the update and the updated stripe mapping information.

8. The storage system according claim 1, wherein in a case where zero data is to be deployed into the second given number of the second nodes, each of the second given number of the second nodes executes at least one of a process for storing zero data into a storage device that the applicable node has and a process for managing information indicative of zero data in an associated relationship with an address that is a deployment destination of zero data in the applicable node.

9. The storage system according claim 1, wherein
in a case where zero data is to be deployed into the second given number of second nodes, each of the second given number of the second nodes does not allocate an actual storage region of a storage device that the applicable node has to a logical address that is a deployment destination of zero data in the applicable node.

10. The storage system according claim 1, wherein
each of the first given number of the first nodes provides a logical volume, and the plurality of data included in the data set before the reconstruction are data of a logical volume individually provided from the nodes different from each other.

11. The storage system according claim 1, wherein
before an instruction to increase the number of data elements that construct the data set by the second given number from the first given number is received, at least the second given number of the second nodes are added in addition to the plurality of nodes to perform scaling out.

12. A non-transitory computer-readable recording medium on which a program for being executed by at least one or more controllers is recorded, comprising:
constructing a data set from a first given number of data elements configured from a plurality of data and redundant data corresponding to the plurality of data;
deploying the first given number of data elements of the data set in a distributed relationship into a first given number of first nodes;
reconstructing, when receiving an instruction to increase the number of data elements that construct the data set from the first given number by a second given number, the data set using, as new data elements, the first given number of data elements of the data set and the second given number of zero data; and
deploying the data elements of the reconstructed data set in a distributed relationship into the first given number of first nodes and the second given number of second nodes and deploying zero data or the redundant data into the second given number of the second nodes from among the data elements of the reconstructed data set,
wherein in a case where a plurality of redundant data are included in the data elements of the reconstructed data set and the plurality of redundant data are to be deployed in a distributed manner to a number of nodes equal to the plurality of redundant data from among the first given number of the first nodes and the second given number of the second nodes,
wherein each of the nodes in which the plurality of redundant data are deployed manages the redundant data deployed in the applicable node and a generation number for identifying a generation of the data set when the applicable redundant data is generated or updated in an associated relationship with each other, and
wherein in a case where a failure occurs with any of the nodes in which the data of the reconstructed data set are deployed, at least one or more of the nodes in which the redundant data are deployed,
acquire the generation numbers managed by the nodes in which the plurality of redundant data are deployed and decides whether or not the generation numbers managed by the other nodes are smaller than the generation number managed by the own node;
roll back, in a case where a result of the applicable decision indicates that the generation numbers managed by the other nodes are smaller than the generation number managed by the own node, the redundant data of the own node to the redundant data in the data set of the generation of the smallest generation number from among the generation numbers managed by the other nodes to execute a rebuild process; and
execute, in a case where the result of the applicable decision indicates that the generation numbers managed by the own node are not smaller than the generation number managed by the own node, a rebuild process with the redundant data managed by the own node.

13. A control method for a system including a plurality of nodes, comprising:
constructing a data set from a first given number of data elements configured from a plurality of data and redundant data corresponding to the plurality of data;
deploying the first given number of data elements of the data set in a distributed relationship into a first given number of first nodes from among the plurality of nodes;
reconstructing, when receiving an instruction to increase the number of data elements that construct the data set from the first given number by a second given number, the data set using, as new data elements, the first given number of data elements of the data set and the second given number of zero data; and
deploying the data elements of the reconstructed data set in a distributed relationship into the first given number of first nodes and the second given number of second nodes and deploying zero data or the redundant data into the second given number of the second nodes from among the data elements of the reconstructed data set
wherein in a case where a plurality of redundant data are included in the data elements of the reconstructed data set and the plurality of redundant data are to be deployed in a distributed manner to a number of nodes equal to the plurality of redundant data from among the first given number of the first nodes and the second given number of the second nodes,
wherein each of the nodes in which the plurality of redundant data are deployed manages the redundant data deployed in the applicable node and a generation number for identifying a generation of the data set when the applicable redundant data is generated or updated in an associated relationship with each other, and
wherein in a case where a failure occurs with any of the nodes in which the data of the reconstructed data set are deployed, at least one or more of the nodes in which the redundant data are deployed,
acquire the generation numbers managed by the nodes in which the plurality of redundant data are deployed and decides whether or not the generation numbers managed by the other nodes are smaller than the generation number managed by the own node;
roll back, in a case where a result of the applicable decision indicates that the generation numbers managed by the other nodes are smaller than the generation number managed by the own node, the redundant data of the own node to the redundant data in the data set of the generation of the smallest generation number from among the generation numbers managed by the other nodes to execute a rebuild process; and execute, in a case where the result of the applicable decision indicates that the generation numbers managed by the own node are not smaller than the generation number managed by the own node, a rebuild process with the redundant data managed by the own node.

* * * * *